US012689962B2

(12) United States Patent
Yang et al.

(10) Patent No.: US 12,689,962 B2
(45) Date of Patent: Jul. 21, 2026

(54) METHOD AND APPARATUS FOR HANDOVER MANAGEMENT

(71) Applicant: Telefonaktiebolaget LM Ericsson (publ), Stockholm (SE)

(72) Inventors: Zhiyu Yang, Nanjing (CN); Xingyang Liu, Nanjing (CN); Junjie Yan, Nanjing (CN)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 611 days.

(21) Appl. No.: 18/027,398

(22) PCT Filed: Sep. 22, 2020

(86) PCT No.: PCT/CN2020/116778
§ 371 (c)(1),
(2) Date: Mar. 21, 2023

(87) PCT Pub. No.: WO2022/061501
PCT Pub. Date: Mar. 31, 2022

(65) Prior Publication Data
US 2023/0337076 A1 Oct. 19, 2023

(51) Int. Cl.
*H04W 4/00* (2018.01)
*H04W 24/02* (2009.01)
(Continued)

(52) U.S. Cl.
CPC ......... *H04W 36/324* (2023.05); *H04W 24/02* (2013.01); *H04W 36/008375* (2023.05)

(58) Field of Classification Search
CPC ............... H04W 36/324; H04W 24/02; H04W 36/008375
(Continued)

(56) References Cited

U.S. PATENT DOCUMENTS 6,240,291 B1 * 5/2001 Narasimhan ........ H04W 36/302
455/442
6,381,463 B1 * 4/2002 Tu ......................... H04W 4/029
455/503
(Continued)

FOREIGN PATENT DOCUMENTS

CN 101884236 A 11/2010
CN 102572982 A 7/2012
(Continued)

OTHER PUBLICATIONS

International Search Report and Written Opinion of the International Searching Authority, PCT/CN2020/116778, mailed Jun. 18, 2021, 7 pages.
(Continued)

*Primary Examiner* — Amancio Gonzalez
(74) *Attorney, Agent, or Firm* — Sage Patent Group

(57) ABSTRACT

Embodiments of the present disclosure provide methods and apparatus for handover management. A method performed by a handover management entity includes receiving a handover request from a network node. The handover request indicates that a first terminal device is to be handed over from a source cell to a target cell. The method further includes obtaining a position of the first terminal device. The method further includes predicting a handover result of the first terminal device by a classifier. The position of the first terminal device is used as an input of the classifier and the classifier is trained for the handover from the source cell to the target cell. The method further includes generating a handover decision based on the predicted handover result. The method further includes sending a handover response comprising the handover decision to the network node.

20 Claims, 22 Drawing Sheets

(51) Int. Cl.
H04W 36/00 (2009.01)
H04W 36/32 (2009.01)

(58) Field of Classification Search
USPC ......................................................... 370/331
See application file for complete search history.

(56) References Cited

U.S. PATENT DOCUMENTS

| | | | | |
|---|---|---|---|---|
| 7,039,406 | B2* | 5/2006 | Ishiguro | H04L 1/0001 |
| | | | | 455/437 |
| 7,623,864 | B2* | 11/2009 | Kang | H04W 36/304 |
| | | | | 455/442 |
| 7,885,231 | B2* | 2/2011 | Kim | H04W 36/0033 |
| | | | | 455/437 |
| 8,208,925 | B2* | 6/2012 | Attar | H04W 36/0061 |
| | | | | 455/437 |
| 8,639,251 | B2* | 1/2014 | Gunnarsson | H04W 36/04 |
| | | | | 455/442 |
| 8,867,484 | B2* | 10/2014 | Sebire | H04M 15/8038 |
| | | | | 370/331 |
| 9,154,999 | B2* | 10/2015 | Takamura | H04W 80/04 |
| 9,544,828 | B2* | 1/2017 | Kitazoe | H04W 36/26 |
| 9,699,696 | B2* | 7/2017 | Grech | H04W 36/0061 |
| 9,756,534 | B2* | 9/2017 | Meshkati | H04W 8/08 |
| 9,807,652 | B2* | 10/2017 | Grech | H04W 36/0072 |
| 9,883,430 | B2* | 1/2018 | Nath | H04W 36/0094 |
| 9,986,440 | B2* | 5/2018 | Guvenc | H04W 76/15 |
| 10,313,940 | B2* | 6/2019 | Jeong | H04W 74/0833 |
| 10,368,284 | B2* | 7/2019 | Lau | H04W 36/26 |
| 10,420,170 | B2* | 9/2019 | Garg | H04W 24/02 |
| 10,694,578 | B2* | 6/2020 | Radulescu | H04W 84/045 |
| 10,779,196 | B2* | 9/2020 | Roy | H04W 36/0009 |
| 11,212,726 | B2* | 12/2021 | Zhou | H04W 36/08 |
| 11,399,326 | B2* | 7/2022 | Latheef | H04W 36/08 |
| 11,483,845 | B2* | 10/2022 | Gordaychik | H04W 72/23 |
| 11,523,311 | B2* | 12/2022 | Donepudi | H04W 4/026 |
| 11,595,937 | B2* | 2/2023 | Bin Redhwan | H04W 64/006 |
| 11,683,728 | B2* | 6/2023 | Akdeniz | H04W 4/70 |
| | | | | 370/331 |
| 11,805,449 | B2* | 10/2023 | Kifle | H04W 36/0072 |
| 11,930,383 | B2* | 3/2024 | Cirkic | H04W 8/22 |
| 12,159,480 | B2* | 12/2024 | Feng | G01S 5/02527 |
| 2002/0107026 | A1* | 8/2002 | Agrawal | H04W 28/26 |
| | | | | 455/436 |
| 2006/0176853 | A1* | 8/2006 | Liu | H04W 36/144 |
| | | | | 370/331 |
| 2006/0234676 | A1* | 10/2006 | Harris | H04L 63/08 |
| | | | | 455/410 |
| 2008/0096560 | A1* | 4/2008 | Felske | H04W 36/144 |
| | | | | 455/436 |
| 2011/0058529 | A1* | 3/2011 | Uemura | H04W 36/0077 |
| | | | | 370/331 |
| 2012/0178455 | A1* | 7/2012 | Sato | H04W 36/324 |
| | | | | 455/436 |

| | | | | |
|---|---|---|---|---|
| 2012/0309398 | A1* | 12/2012 | Watanabe | H04W 36/302 |
| | | | | 455/437 |
| 2015/0098387 | A1 | 4/2015 | Garg et al. | |
| 2015/0148040 | A1 | 5/2015 | Ehrlich et al. | |
| 2015/0319668 | A1* | 11/2015 | Guo | H04W 72/51 |
| | | | | 370/331 |
| 2017/0142650 | A1* | 5/2017 | Wang | H04W 48/20 |
| 2019/0108448 | A1 | 4/2019 | O'Malia | |
| 2021/0250822 | A1* | 8/2021 | Mishra | H04W 4/029 |
| 2022/0104725 | A9* | 4/2022 | Imran | A61B 5/4824 |
| 2022/0126864 | A1* | 4/2022 | Moustafa | B60W 60/0013 |
| 2022/0159525 | A1* | 5/2022 | Chou | H04W 36/0058 |
| 2024/0037409 | A1* | 2/2024 | Ickin | G06N 3/09 |
| 2024/0430778 | A1* | 12/2024 | Epstein | H04B 7/0691 |

FOREIGN PATENT DOCUMENTS

| | | |
|---|---|---|
| CN | 105636127 A | 6/2016 |
| CN | 111343680 A | 6/2020 |

OTHER PUBLICATIONS

Ericsson, "SON Scope and Requirements for Rel. 17," 3GPP TSG-RAN WG2 #111e Tdoc R2-2007661, Aug. 6, 2020, 10 pages.

3rd Generation Partnership Project; Technical Specification Group Radio Access Network; NR; Radio Resource Control (RRC) protocol specification (Release 15) 3GPP TS 38.331 V15.6.0 (Jun. 2019) 519 pages.

"O-RAN Architecture Description," O-RAN-WG1-O-RAN Architecture Description—v01.00.00, Technical Specification, O-RAN Alliance, Copyright 2020, 24 pages.

"O-RAN Working Group 2 (Non-RT RIC & A1 interface)" ORAN-WG2.Use Case Requirements v01.00, O-RAN Alliance, Copyright 2020, 27 pages.

3GPP TSG-SA5 (Telecom Management) S5-080326R1 Meeting SA5#58, Feb. 18-22, 2008, St Julian, Malta, New BB-level WID on Management of Self-Organising Networks (SON), 2 pages.

3GPP TSG-SA5 (Telecom Management) S5-080327R1 Meeting SA5#58, Feb. 18-22, 2008, St Julian, Malta, New WT-level WID on Self-Configuration of eNodeBs, 2 pages.

3GPP TSG-SA5 (Telecom Management) S5-080329R1 Meeting SA5#58, Feb. 18-22, 2008, St Julian, Malta, New WT-level WID on SON self-optimization handling, 2 pages.

Extended European Search Report, Oct. 9, 2023, Patent Application No. 20954355.2, mailed Oct. 9, 2023, 5 pages.

Office Action, Chinese Patent Application No. Chinese Patent Application for Invention No. 202080105397.4, mailed Nov. 14, 2024, 9 pages.

"Definition and Prevention to Handover to Wrong Cell," 3GPP TSG-RAN WG3 #65, R3-091848, Aug. 24-28, 2009, Shenzhen, China, Alcatel-Lucent, 4 pages.

Yuanfeng Ding, Study on Soft Handover Technology in High speed Train wayside Broadband Communication System, Journal of the China railway society, 2020, v.42; No. 273 (07): pp. 87-94, 8 pages.

* cited by examiner

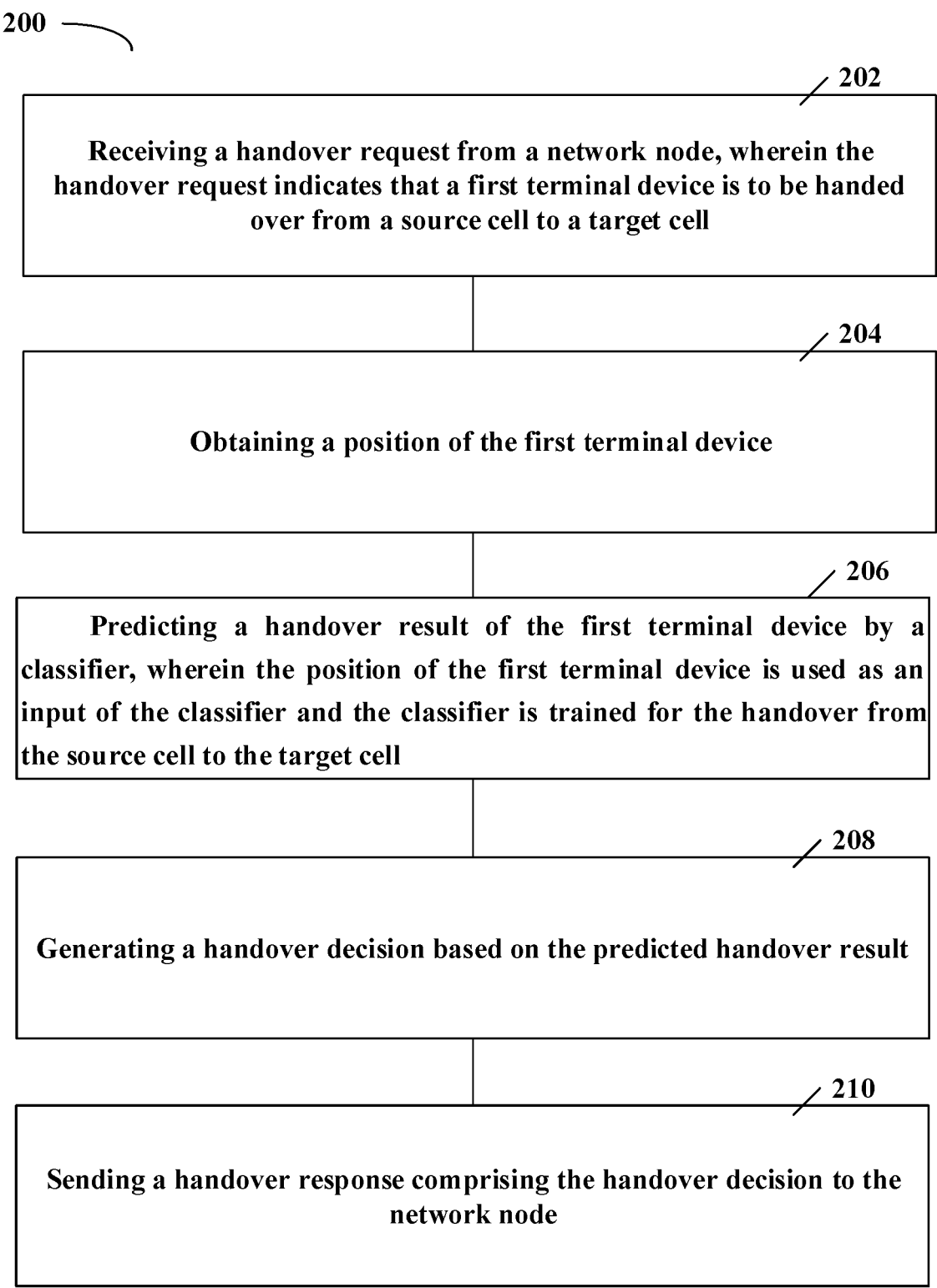

200

202

Receiving a handover request from a network node, wherein the handover request indicates that a first terminal device is to be handed over from a source cell to a target cell

204

Obtaining a position of the first terminal device

206

Predicting a handover result of the first terminal device by a classifier, wherein the position of the first terminal device is used as an input of the classifier and the classifier is trained for the handover from the source cell to the target cell

208

Generating a handover decision based on the predicted handover result

210

Sending a handover response comprising the handover decision to the network node

FIG. 2

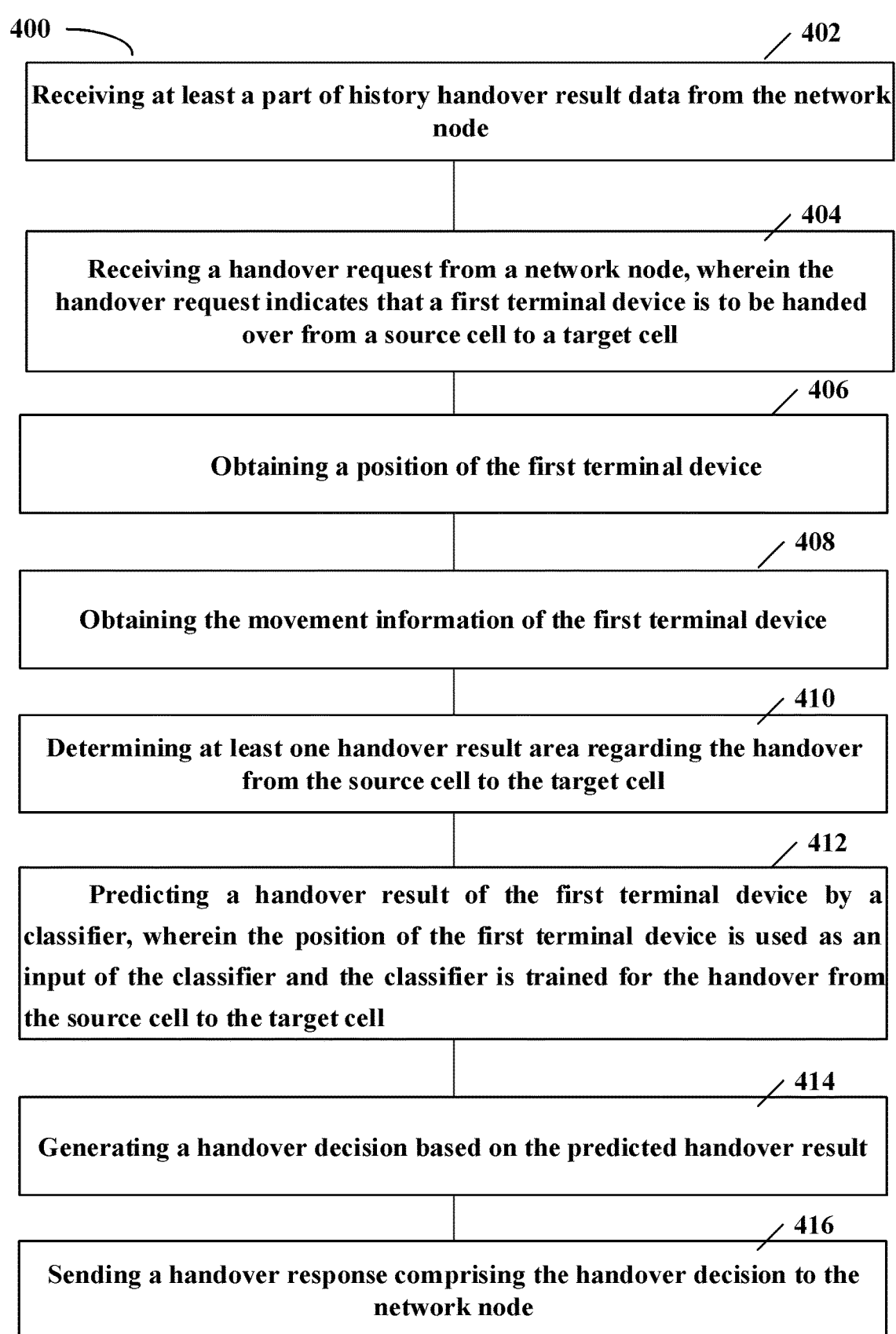

400

402

Receiving at least a part of history handover result data from the network node

404

Receiving a handover request from a network node, wherein the handover request indicates that a first terminal device is to be handed over from a source cell to a target cell

406

Obtaining a position of the first terminal device

408

Obtaining the movement information of the first terminal device

410

Determining at least one handover result area regarding the handover from the source cell to the target cell

412

Predicting a handover result of the first terminal device by a classifier, wherein the position of the first terminal device is used as an input of the classifier and the classifier is trained for the handover from the source cell to the target cell

414

Generating a handover decision based on the predicted handover result

416

Sending a handover response comprising the handover decision to the network node

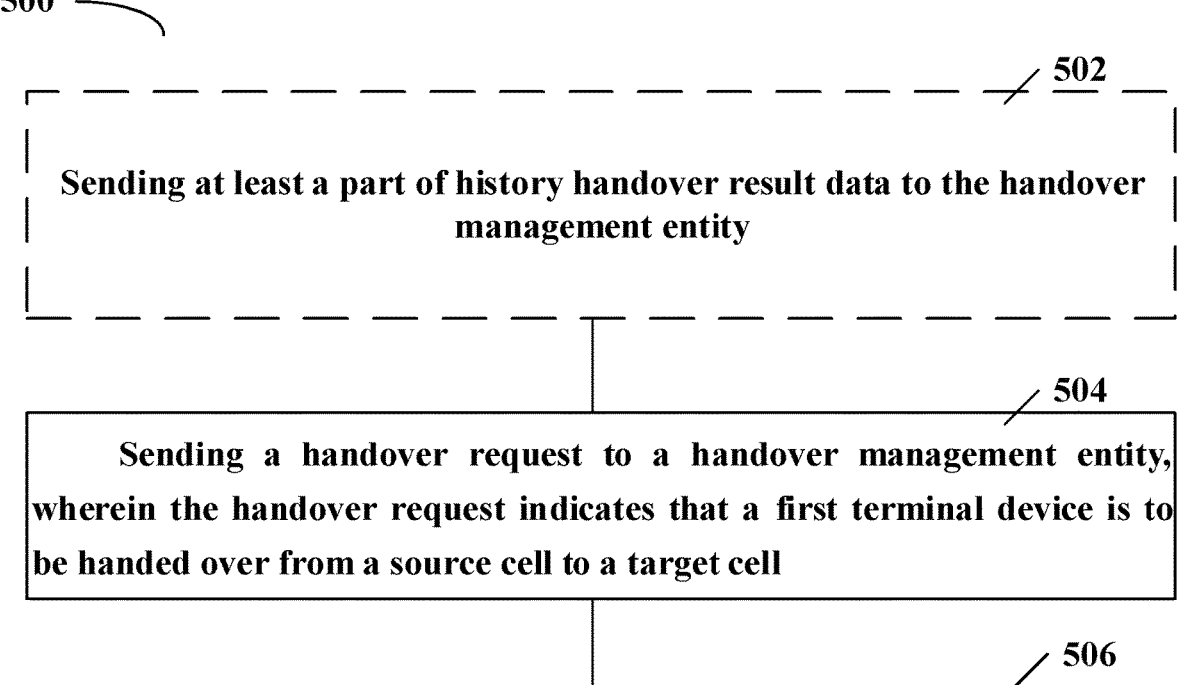

502

Sending at least a part of history handover result data to the handover management entity

504

Sending a handover request to a handover management entity, wherein the handover request indicates that a first terminal device is to be handed over from a source cell to a target cell

506

Receiving a handover response comprising a handover decision from the handover management entity, wherein the handover decision is generated based on a predicted handover result of the first terminal device and the predicted handover result of the first terminal device is predicted by a classifier, wherein a position of the first terminal device is used as an input of the classifier and the classifier is trained for the handover from the source cell to the target cell

FIG. 5

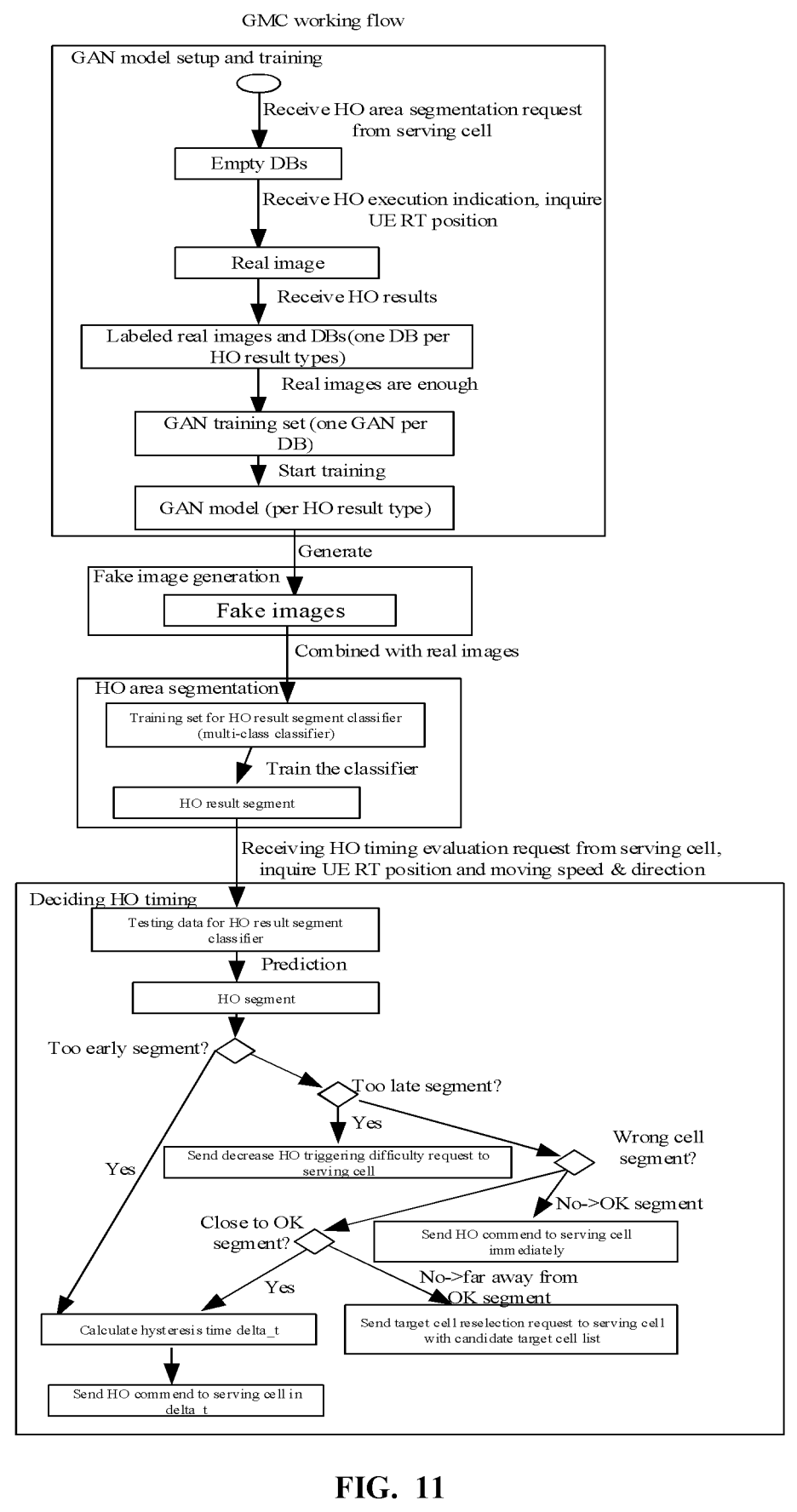

GMC working flow

GAN model setup and training

Receive HO area segmentation request from serving cell

Empty DBs

Receive HO execution indication, inquire UE RT position

Real image

Receive HO results

Labeled real images and DBs(one DB per HO result types)

Real images are enough

GAN training set (one GAN per DB)

Start training

GAN model (per HO result type)

Generate

Fake image generation

Fake images

Combined with real images

HO area segmentation

Training set for HO result segment classifier (multi-class classifier)

Train the classifier

HO result segment

Receiving HO timing evaluation request from serving cell, inquire UE RT position and moving speed & direction

Deciding HO timing

Testing data for HO result segment classifier

Prediction

HO segment

Too early segment?

Too late segment?

Yes

Send decrease HO triggering difficulty request to serving cell

Yes

Wrong cell segment?

No->OK segment

Send HO commend to serving cell immediately

Close to OK segment?

Yes

No->far away from OK segment

Calculate hysteresis time delta_t

Send target cell reselection request to serving cell with candidate target cell list Send HO commend to serving cell in delta_t

FIG. 11

METHOD AND APPARATUS FOR HANDOVER MANAGEMENT

CROSS REFERENCE TO RELATED APPLICATIONS

This application is a 35 U.S.C. § 371 national stage application of PCT International Application No. PCT/CN2020/116778 filed on Sep. 22, 2020, the disclosure and content of which is incorporated by reference herein in its entirety.

TECHNICAL FIELD

The non-limiting and exemplary embodiments of the present disclosure generally relate to the technical field of communications, and specifically to methods and apparatuses for handover management.

BACKGROUND

This section introduces aspects that may facilitate a better understanding of the disclosure. Accordingly, the statements of this section are to be read in this light and are not to be understood as admissions about what is in the prior art or what is not in the prior art.

Communication service providers and network operators have been continually facing challenges to deliver value and convenience to consumers by, for example, providing compelling network services and performance. With the rapid development of networking and communication technologies, wireless communication networks such as long-term evolution (LTE)/fourth generation (4G) network and new radio (NR)/fifth generation (5G) network are expected to achieve high traffic capacity and end-user data rate with lower latency. To meet the diverse requirements of new services across a wide variety of industries, the 3rd generation partnership project (3GPP) is developing various network function services for various communication networks.

An ability to perform handovers between cells may be a requirement of any wireless network such as cellular network. Mobility may remove location-based anchors, improve the user experience and reduce hardware installation constraints.

Providing a quality mobility service may rely on a calibration and configuration of mobility parameters by network operators. In order to reduce network configuration efforts and to allow the network to adapt to changing environments, a concept of Self Organizing Networks (SON) has been introduced in a suite of 3GPP protocols.

In the context of SON, Mobility Robustness Optimization (MRO) is one of technologies in SON. MRO may refer to a category of procedures that allow cellular networks to select their own set of optimal mobility parameters. Such procedures may be run autonomously and without human intervention in either a centralized or de-centralized manner across the network.

As described in 3GPP TS 36.300 V16.2.0, the disclosure of which is incorporated by reference herein in their entirety, one of the functions of MRO is to detect connection failures that occur due to Too Early or Too Late Handovers, or Handover to Wrong Cell. These handover problems are defined as follows:

Too Late Handover: A Radio Link Failures (RLF) occurs after a user equipment (UE) has stayed for a long period of time in the cell. The UE attempts to re-establish the radio link connection in a different cell.

Too Early Handover: An RLF occurs shortly after a successful handover from a source cell to a target cell or a handover failure occurs during the handover procedure. The UE attempts to re-establish the radio link connection in the source cell.

Handover to Wrong Cell: An RLF occurs shortly after a successful handover from a source cell to a target cell or a handover failure occurs during the handover procedure. The UE attempts to re-establish the radio link connection in a cell other than the source cell and the target cell.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

As described above, there are some problems in the handover, such as Too Late Handover, Too Early Handover, Handover to Wrong Cell, etc. However, some exiting solutions for these handover problems may also have some problems.

For example, an existing MRO solution may rely on adjusting CIO (cell individual offset) for example according to a proportion of identified connection failure types. The CIO parameter may be applicable to a specific cell and may be used as offset in cell re-selection. For example, a CIO value dB-24 corresponds to −24 dB, dB-22 corresponds to −22 dB and so on. As an example, if the number of "too early handover" is more than the number of "too late handover", the CIO of a neighbor cell may be decreased by a step in a MRO period and vice versa. For the handover from a source cell to a target cell, it's possible that some UEs may have "too late handover" problem, some UEs may have "too early handover" problem, and some UEs may have "handover to wrong cell" problem. So it may be hard to satisfy all of UEs with the same CIO adjustment. In addition, the CIO adjustment may be oscillating in different optimization periods for example depending on a frequency of different handover problems.

It may be hard to decide handover triggering parameters such as CIO adjustment parameters. The handover triggering parameters, e.g. CIO adjustment upper limit, CIO adjustment lower limit, CIO adjustment step, etc., may be input manually in a cell deployment phase. The suitable handover triggering parameters may depend on a rich experience of network operators. However, the network operators may not have rich network tuning experience in some cases.

The handover triggering parameters may be required to be tailored to a specific cell. However, there may be no default set of mobility parameters which can perform optimally in different cells.

Small cell networks in enterprise scenarios may involve large numbers of cells to guarantee coverage. In dense multi-cell scenarios, it may require the network operators to configure each cell individually. However the number of low-cost small cells to be deployed means that this configuration may be not practical.

If the handover problems illustrated above are not solved, the network may deal with numerous radio resource control (RRC) connection setups and re-establishments of UEs. These RRC connection setups and re-establishments may not always succeed, thus disrupting a connectivity of the UEs, worsening user experience and increasing network signaling load.

To overcome or mitigate at least one of above mentioned problems or other problems, the embodiments of the present disclosure propose an improved solution for handover management.

In a first aspect of the disclosure, there is provided a method performed by a handover management entity. The method comprises receiving a handover request from a network node. The handover request indicates that a first terminal device is to be handed over from a source cell to a target cell. The method further comprises obtaining a position of the first terminal device. The method further comprises predicting a handover result of the first terminal device by a classifier. The position of the first terminal device is used as an input of the classifier and the classifier is trained for the handover from the source cell to the target cell. The method further comprises generating a handover decision based on the predicted handover result. The method further comprises sending a handover response comprising the handover decision to the network node.

In an embodiment, the classifier may be trained by a training set and the training set comprises history handover result data regarding the handover from the source cell to the target cell.

In an embodiment, the training set may further comprise handover result data regarding the handover from the source cell to the target cell generated by a generative adversarial network.

In an embodiment, for a specific type of handover result, a corresponding type of generative adversarial network may be trained by using the corresponding type of history handover result data regarding the handover from the source cell to the target cell.

In an embodiment, the handover result data may comprise a position of a terminal device, a handover result, a source cell identifier, a target cell identifier, a wrong cell identifier when the terminal device being handed over to a wrong cell.

In an embodiment, the handover result data may further comprise at least one of antenna information of the source cell, antenna information of the target cell, antenna information of the wrong cell, a relative position of the terminal device to the antenna of a source cell, a relative position of the terminal device to the antenna of the target cell, or a relative position of the terminal device to the antenna of the wrong cell.

In an embodiment, the handover result may comprise at least one of too late handover; too early handover; handover to a wrong cell; or handover success.

In an embodiment, when the predicted handover result indicates too late handover, the handover decision may indicate the network node to decrease a handover triggering difficulty.

In an embodiment, when the predicted handover result indicates handover success, the handover decision may indicate the network node to immediately perform the handover; or In an embodiment, when the predicted handover result indicates too early handover or handover to a wrong cell, the handover decision may be generated further based on the movement information of the first terminal device.

In an embodiment, the method may further comprise obtaining the movement information of the first terminal device.

In an embodiment, the movement information of the first terminal device may comprise at least one of moving speed of the first terminal device; a moving direction of the first terminal device; or an acceleration of the first terminal device.

In an embodiment where the handover decision is generated further based on the movement information of the first terminal device, when the first terminal device will enter into a handover success area at a particular time point, the handover decision may indicate the network node the particular time point for performing the handover; or when the first terminal device will enter into a handover success area at a particular time point, the handover decision may indicate the network node to perform the handover, wherein the response comprising the handover decision is sent to the network node at or after the particular time point; or when the first terminal device is moving far away from a handover success area, the handover decision may comprise at least one recommended target cell and indicates the network node to perform cell reselection based on the at least one recommended target cell.

In an embodiment, the method may further comprise determining at least one handover result area regarding the handover from the source cell to the target cell.

In an embodiment, the method may further comprise receiving at least a part of history handover result data from the network node.

In an embodiment, the handover management entity may be deployed into an open radio access network.

In a second aspect of the disclosure, there is provided a method performed by a network node. The method comprises sending a handover request to a handover management entity. The handover request indicates that a first terminal device is to be handed over from a source cell to a target cell. The method further comprises receiving a handover response comprising a handover decision from the handover management entity. The handover decision is generated based on a predicted handover result of the first terminal device and the predicted handover result of the first terminal device is predicted by a classifier. A position of the first terminal device is used as an input of the classifier and the classifier is trained for the handover from the source cell to the target cell.

In an embodiment, the method may further comprise sending at least a part of history handover result data to the handover management entity.

In a third aspect of the disclosure, there is provided a handover management entity. The handover management entity comprises a processor; and a memory, the memory containing instructions executable by the processor, whereby the handover management entity is operative to receive a handover request from a network node. The handover request indicates that a first terminal device is to be handed over from a source cell to a target cell. The handover management entity is further operative to obtain a position of the first terminal device. The handover management entity is further operative to predict a handover result of the first terminal device by a classifier. The position of the first terminal device is used as an input of the classifier and the classifier is trained for the handover from the source cell to the target cell. The handover management entity is further operative to generate a handover decision based on the predicted handover result. The handover management entity is further operative to send a handover response comprising the handover decision to the network node.

In an embodiment, the handover management entity may be further operative to obtain the movement information of the first terminal device.

In an embodiment, the handover management entity may be further operative to determine at least one handover result area regarding the handover from the source cell to the target cell.

In an embodiment, the handover management entity may be further operative to receive at least a part of history handover result data from the network node.

In a fourth aspect of the disclosure, there is provided a network node. The network node comprises a processor; and a memory, the memory containing instructions executable by the processor, whereby the network node is operative to send a handover request to a handover management entity. The handover request indicates that a first terminal device is to be handed over from a source cell to a target cell. The network node is further operative to receive a handover response comprising a handover decision from the handover management entity. The handover decision is generated based on a predicted handover result of the first terminal device and the predicted handover result of the first terminal device is predicted by a classifier. A position of the first terminal device is used as an input of the classifier and the classifier is trained for the handover from the source cell to the target cell.

In an embodiment, the network node is further operative to send at least a part of history handover result data to the handover management entity.

In a fifth aspect of the disclosure, there is provided a computer program product comprising instructions which, when executed on at least one processor, cause the at least one processor to carry out the method according to any of the first and second aspects of the disclosure.

In a sixth aspect of the disclosure, there is provided a computer-readable storage medium storing instructions which, when executed on at least one processor, cause the at least one processor to carry out the method according to any of the first and second aspects of the disclosure.

Another aspect of the present disclosure provides a communication system including a host computer including: processing circuitry configured to provide user data; and a communication interface configured to forward the user data to a cellular network for transmission to a terminal device. The cellular network includes the above mentioned network node and/or a terminal device.

In embodiments of the present disclosure, the system further includes the terminal device, wherein the terminal device is configured to communicate with the network node.

In embodiments of the present disclosure, the processing circuitry of the host computer is configured to execute a host application, thereby providing the user data; and the terminal device includes processing circuitry configured to execute a client application associated with the host application.

Another aspect of the present disclosure provides a communication system including a host computer including: a communication interface configured to receive user data originating from a transmission from a terminal device; a network node. The transmission is from the terminal device to the network node. The network node is above mentioned.

In embodiments of the present disclosure, the processing circuitry of the host computer is configured to execute a host application. The terminal device is configured to execute a client application associated with the host application, thereby providing the user data to be received by the host computer.

Another aspect of the present disclosure provides a method implemented in a communication system which may include a host computer, a network node and a terminal device. The method may comprise providing user data at the host computer. Optionally, the method may comprise, at the host computer, initiating a transmission carrying the user data to the terminal device via a cellular network comprising the network node which may perform any step of the method according to the second aspect of the present disclosure.

Another aspect of the present disclosure provides a communication system including a host computer. The host computer may comprise processing circuitry configured to provide user data, and a communication interface configured to forward the user data to a cellular network for transmission to a terminal device. The cellular network may comprise a network node having a radio interface and processing circuitry. The network node's processing circuitry may be configured to perform any step of the method according to the second aspect of the present disclosure.

Another aspect of the present disclosure provides a method implemented in a communication system which may include a host computer, a network node and a terminal device. The method may comprise providing user data at the host computer. Optionally, the method may comprise, at the host computer, initiating a transmission carrying the user data to the terminal device via a cellular network comprising the network node.

Another aspect of the present disclosure provides a communication system including a host computer. The host computer may comprise processing circuitry configured to provide user data, and a communication interface configured to forward user data to a cellular network for transmission to a terminal device. The terminal device may comprise a radio interface and processing circuitry.

Another aspect of the present disclosure provides a method implemented in a communication system which may include a host computer, a network node and a terminal device. The method may comprise, at the host computer, receiving user data transmitted to the network node from the terminal device.

Another aspect of the present disclosure provides a communication system including a host computer. The host computer may comprise a communication interface configured to receive user data originating from a transmission from a terminal device to a network node. The terminal device may comprise a radio interface and processing circuitry.

Another aspect of the present disclosure provides a method implemented in a communication system which may include a host computer, a network node and a terminal device. The method may comprise, at the host computer, receiving, from the network node, user data originating from a transmission which the network node has received from the terminal device. The network node may perform any step of the method according to the second aspect of the present disclosure.

Another aspect of the present disclosure provides a communication system which may include a host computer. The host computer may comprise a communication interface configured to receive user data originating from a transmission from a terminal device to a network node. The network node may comprise a radio interface and processing circuitry. The network node's processing circuitry may be configured to perform any step of the method according to the second aspect of the present disclosure.

Various embodiments herein offer various advantages, of which a non-exhaustive list of examples follows. In some embodiments herein, the proposed solution may not need an intervention of the network operators. The proposed solution may not rely on any prior MRO parameter setting which can only be provided by the network operators who have rich network tuning experience. For example, the initial CIO parameter can be set randomly. Instead, MRO related work such as deciding handover timing, adjusting HO trigger threshold, etc. may be done by the handover management entity automatically. In some embodiments herein, the proposed solution may satisfy most UEs or all of UEs with different handover problems. For example, different from a legacy MRO solution where each parameter (e.g., CIO) adjustment may only satisfy a part of UEs but not most UEs with different handover problems in the network. Instead, the proposed solution can satisfy most UEs or all of UEs. In some embodiments herein, the proposed solution can solve or mitigate an oscillation issue of optimization parameter (e.g., CIO). For example, in the legacy MRO solution, the optimization parameter (e.g., CIO) could be oscillating depending on the percentage of each handover problem in different adjustment periods, while the proposed solution may solve or mitigate the oscillation issue of optimization parameter. The embodiments herein are not limited to the features and advantages mentioned above. A person skilled in the art will recognize additional features and advantages upon reading the following detailed description.

BRIEF DESCRIPTION OF THE DRAWINGS

The above and other aspects, features, and benefits of various embodiments of the present disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which:

FIG. 2 shows a flowchart of a method according to an embodiment of the present disclosure;

FIG. 4 shows a flowchart of a method according to another embodiment of the present disclosure;

FIG. 5 shows a flowchart of a method according to another embodiment of the present disclosure;

FIG. 11 shows a flowchart of GMC working flow according to an embodiment of the present disclosure;

DETAILED DESCRIPTION

Figure 1A:
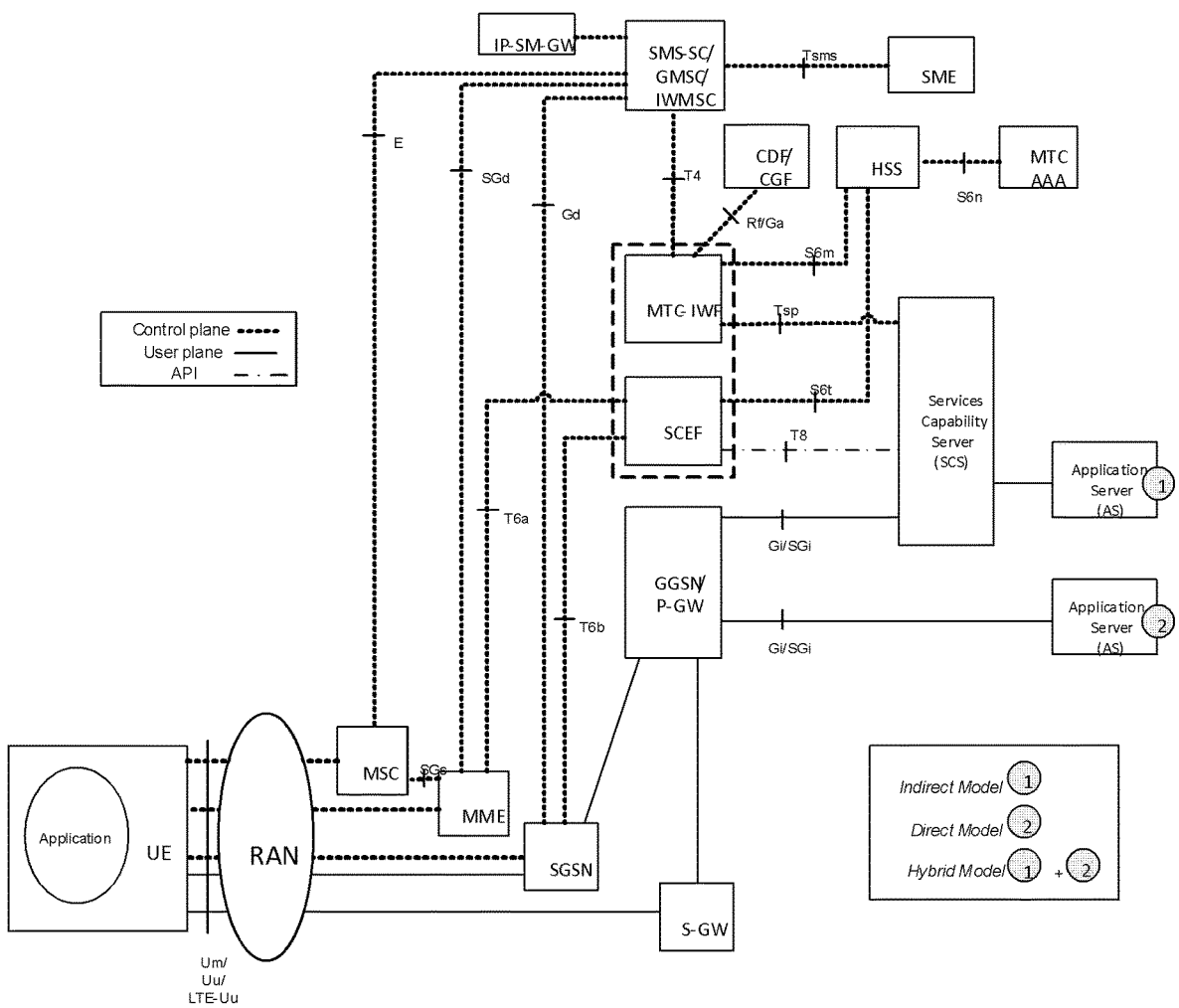
FIG. 1a schematically shows a system architecture in a 4G network.

The embodiments of the present disclosure are described in detail with reference to the accompanying drawings. It should be understood that these embodiments are discussed only for the purpose of enabling those skilled persons in the art to better understand and thus implement the present disclosure, rather than suggesting any limitations on the scope of the present disclosure. Reference throughout this specification to features, advantages, or similar language does not imply that all of the features and advantages that may be realized with the present disclosure should be or are in any single embodiment of the disclosure. Rather, language referring to the features and advantages is understood to mean that a specific feature, advantage, or characteristic described in connection with an embodiment is included in at least one embodiment of the present disclosure. Furthermore, the described features, advantages, and characteristics of the disclosure may be combined in any suitable manner in one or more embodiments. One skilled in the relevant art will recognize that the disclosure may be practiced without one or more of the specific features or advantages of a particular embodiment. In other instances, additional features and advantages may be recognized in certain embodiments that may not be present in all embodiments of the disclosure.

As used herein, the term "network" refers to a network following any suitable wireless communication standards. For example, the wireless communication standards may comprise new radio (NR), long term evolution (LTE), LTE-Advanced, wideband code division multiple access (WCDMA), high-speed packet access (HSPA), Code Division Multiple Access (CDMA), Time Division Multiple Address (TDMA), Frequency Division Multiple Access (FDMA), Orthogonal Frequency-Division Multiple Access (OFDMA), Single carrier frequency division multiple access (SC-FDMA) and other wireless networks. A CDMA network may implement a radio technology such as Universal Terrestrial Radio Access (UTRA), etc. UTRA includes WCDMA and other variants of CDMA. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDMA, Ad-hoc network, wireless sensor network, etc. In the following description, the terms "network" and "system" can be used interchangeably. Furthermore, the communications between two devices in the network may be performed according to any suitable communication protocols, including, but not limited to, the wireless communication protocols as defined by a standard organization such as 3rd generation partnership project (3GPP). For example, the wireless communication protocols may comprise the first generation (1G), 2G, 3G, 4G, 4.5G, 5G communication protocols, and/or any other protocols either currently known or to be developed in the future.

The term "network node" as used herein refers to a network device (physical or virtual) in a communication network. For example, the network node may be an access network device in a communication network via which a terminal device accesses to the network and receives services therefrom. For example, the network node may comprise, but not limited to, an Integrated Access and Backhaul (IAB) node, an access point (AP), a multi-cell/multicast coordination entity (MCE), a base station (BS), etc. The access network device may be, for example, a node B (NodeB or NB), an evolved NodeB (eNodeB or eNB), a next generation NodeB (gNodeB or gNB), a remote radio unit (RRU), a radio header (RH), a remote radio head (RRH), a relay, a low power node such as a femto, a pico, and so forth.

Yet further examples of the network node comprise multi-standard radio (MSR) radio equipment such as MSR BSs, network controllers such as radio network controllers (RNCs) or base station controllers (BSCs), base transceiver stations (BTSs), transmission points, transmission nodes, positioning nodes and/or the like. More generally, however, the network node may represent any suitable device (or group of devices) capable, configured, arranged, and/or operable to enable and/or provide a terminal device access to a wireless communication network or to provide some service to a terminal device that has accessed to the wireless communication network.

The term "entity" used herein refers to a network device or a network node or a network function in a communication network. For example, a network entity can be implemented either as a network element on a dedicated hardware, as a software instance running on a dedicated hardware, or as a virtualized function instantiated on an appropriate platform, e.g. on a cloud infrastructure.

The term "terminal device" refers to any end device that can access a communication network and receive services therefrom. By way of example and not limitation, the terminal device refers to a mobile terminal, user equipment (UE), or other suitable devices. The UE may be, for example, a Subscriber Station (SS), a Portable Subscriber Station, a Mobile Station (MS), or an Access Terminal (AT). The terminal device may include, but not limited to, a portable computer, an image capture terminal device such as a digital camera, a gaming terminal device, a music storage and a playback appliance, a mobile phone, a cellular phone, a smart phone, a voice over IP (VOIP) phone, a wireless local loop phone, a tablet, a wearable device, a personal digital assistant (PDA), a portable computer, a desktop computer, a wearable terminal device, a vehicle-mounted wireless terminal device, a wireless endpoint, a mobile station, a laptop-embedded equipment (LEE), a laptop-mounted equipment (LME), a USB (Universal Serial Bus) dongle, a smart device, a wireless customer-premises equipment (CPE) and the like. In the following description, the terms "terminal device", "terminal", "user equipment" and "UE" may be used interchangeably. As one example, a terminal device may represent a UE configured for communication in accordance with one or more communication standards promulgated by the 3GPP, such as 3GPP' LTE standard or NR standard. As used herein, a "user equipment" or "UE" may not necessarily have a "user" in the sense of a human user who owns and/or operates the relevant device. In some embodiments, a terminal device may be configured to transmit and/or receive information without direct human interaction. For instance, a terminal device may be designed to transmit information to a network on a predetermined schedule, when triggered by an internal or external event, or in response to requests from the communication network. Instead, a UE may represent a device that is intended for sale to, or operation by, a human user but that may not initially be associated with a specific human user.

As yet another example, in an Internet of Things (IoT) scenario, a terminal device may represent a machine or other device that performs monitoring and/or measurements, and transmits the results of such monitoring and/or measurements to another terminal device and/or network equipment. The terminal device may in this case be a machine-to-machine (M2M) device, which may in a 3GPP context be referred to as a machine-type communication (MTC) device. As one particular example, the terminal device may be a UE implementing the 3GPP narrow band internet of things (NB-IoT) standard. Particular examples of such machines or devices are sensors, metering devices such as power meters, industrial machinery, or home or personal appliances, for example refrigerators, televisions, personal wearables such as watches etc. In other scenarios, a terminal device may represent a vehicle or other equipment that is capable of monitoring and/or reporting on its operational status or other functions associated with its operation.

References in the specification to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the associated listed terms.

As used herein, the phrases "at least one of A or B" and "at least one of A and B" should be understood to mean "only A, only B, or both A and B." The phrase "A and/or B" should be understood to mean "only A, only B, or both A and B."

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

It is noted that these terms as used in this document are used only for ease of description and differentiation among nodes, devices or networks etc. With the development of the technology, other terms with the similar/same meanings may also be used.

In the following description and claims, unless defined otherwise, all technical and scientific terms used herein have the same meaning as commonly understood by one of ordinary skills in the art to which this disclosure belongs.

It is noted that some embodiments of the present disclosure are mainly described in relation to the cellular network as defined by 3GPP being used as non-limiting examples for certain exemplary network configurations and system deployments. As such, the description of exemplary embodiments given herein specifically refers to terminology which is directly related thereto. Such terminology is only used in the context of the presented non-limiting examples and embodiments, and does naturally not limit the present disclosure in any way. Rather, any other system configuration or radio technologies such as wireless sensor network may equally be utilized as long as exemplary embodiments described herein are applicable.

Figure 1B:
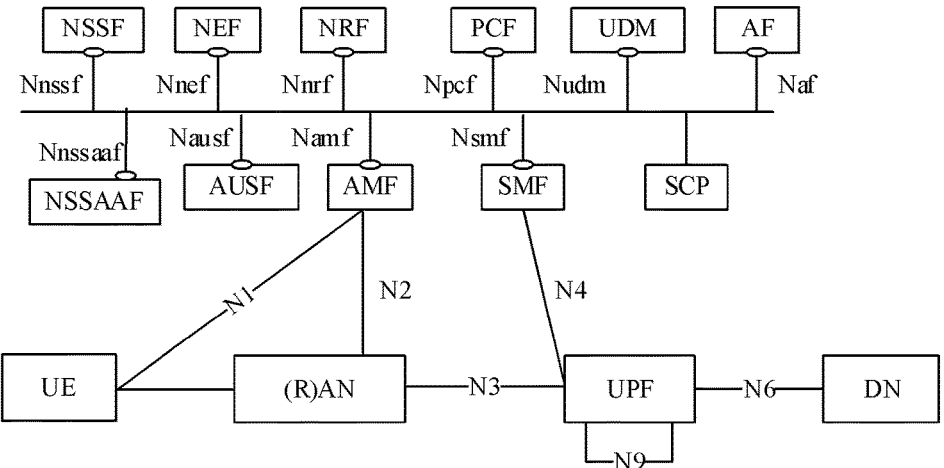
FIG. 1b schematically shows a system architecture in a 5G network.

FIGS. 1a-1b show some system architectures in which the embodiments of the present disclosure can be implemented. For simplicity, the system architectures of FIGS. 1a-1b only depict some exemplary elements. In practice, a communication system may further include any additional elements suitable to support communication between terminal devices or between a wireless device and another communication device, such as a landline telephone, a service provider, or any other network node or terminal device. The communication system may provide communication and various types of services to one or more terminal devices to facilitate the terminal devices' access to and/or use of the services provided by, or via, the communication system.

FIG. 1a schematically shows a system architecture in a 4G network, which is the same as FIG. 4.2-1a of 3GPP TS 23.682 V16.7.0, the disclosure of which is incorporated by reference herein in its entirety. The system architecture of FIG. 1a may comprise some exemplary elements such as Services Capability Server (SCS), Application Server (AS), SCEF, HSS, UE, RAN (Radio Access Network), SGSN (Serving GPRS (General Packet Radio Service) Support Node), MME, MSC (Mobile Switching Centre), S-GW (Serving Gateway), GGSN/P-GW (Gateway GPRS Support Node/PDN (Packet Data Network) Gateway), MTC-IWF (Machine Type Communications-InterWorking Function) CDF/CGF (Charging Data Function/Charging Gateway Function), MTC-AAA (Machine Type Communications-authentication, authorization and accounting), SMS-SC/GMSC/IWMSC (Short Message Service-Service Centre/Gateway MSC/InterWorking MSC) IP-SM-GW (Internet protocol Short Message Gateway). The network elements and interfaces as shown in FIG. 1a may be same as the corresponding network elements and interfaces as described in 3GPP TS 23.682 V16.7.0.

FIG. 1b schematically shows a system architecture in a 5G network, which is the same as FIG. 4.2.3-1 of 3GPP TS 23.501 V16.5.1, the disclosure of which is incorporated by reference herein in its entirety. The system architecture of FIG. 1b may comprise some exemplary elements such as AMF (Access and mobility Function), SMF (Session Management Function), AUSF (Authentication Service Function), UDM (Unified Data Management), PCF (Policy Control Function), AF (Application Function), NEF (Network Exposure Function), UPF (User plane Function), NRF (Network Repository Function), RAN (radio access network), SCP (service communication proxy), NSSF (Network Slice Selection Function), NSSAAF (Network Slice-Specific Authentication and Authorization Function), etc. The network elements, reference points and interfaces as shown in FIG. 1b may be same as the corresponding network elements, reference points and interfaces as described in 3GPP TS 23.501 V16.5.1.

FIG. 2 shows a flowchart of a method 200 according to an embodiment of the present disclosure, which may be performed by an apparatus implemented in or at or as a handover management entity or communicatively coupled to the handover management entity. As such, the apparatus may provide means or modules for performing various operations of the method 200 as well as means or modules for performing other operations in conjunction with other components.

The handover management entity may be implemented either as a network element on a dedicated hardware, as a software instance running on a dedicated hardware, as a network function on a network element, or as a virtualized function instantiated on an appropriate platform, e.g. on a cloud infrastructure. For example, the handover management entity may be implemented as a network function on any suitable network node (such as RAN or (R)AN) as shown in FIGS. 1a and 1b. Alternatively, the handover management entity may be implemented in two or more devices. For example, a first part of functions of the handover management entity may be implemented in a first device; a second part of functions of the handover management entity may be implemented in a second device; and so on. In an embodiment, a training function of the handover management entity may be implemented in a server and a classifying function of the handover management entity may be implemented in an access network node.

At block 202, the handover management entity may receive a handover request from a network node. The handover request indicates that a first terminal device is to be handed over from a source cell to a target cell.

The handover may be any suitable handover, such as intra system handover, inter system handover, etc. In an embodiment, the handover may be any of handovers as described in clause 5.5 of 3GPP TS 23.401 V16.6.0 (the disclosure of which is incorporated by reference herein in its entirety) and clause 4.9 of 3GPP TS 23.502 V16.5.1.

The handover may be triggered, for example, due to various reasons, such as new radio conditions, load balancing or due to specific service e.g. in the presence of QoS (Quality of Service) flow for voice, etc.

At block 204, the handover management entity may obtain a position of the first terminal device. The handover management entity may obtain the position of the first terminal device in various ways. For example, when the position of the first terminal device is included in the handover request, the handover management entity may obtain the position of the first terminal device from the handover request. Alternatively, the handover management entity may obtain the position of the first terminal device from another device such as a location server. For example, the position data of the first terminal device in the location server may come from a positioning module (such as GPS (Global Positioning System)) of the first terminal device or come from the location services of the network.

At block 206, the handover management entity may predict a handover result of the first terminal device by a classifier. The position of the first terminal device is used as an input of the classifier. The classifier is trained for the handover from the source cell to the target cell.

The classifier may be any suitable classifier which can map input data (such as the position of the first terminal device) to a specific class (such as handover result class). The classifier can be implemented by using various technologies such as neural networks, deep learning, etc. In an embodiment, the classifier may be multi-class classifier. In multi-class classifier, each input data or sample may be assigned to one and only one label or class.

In an embodiment, the classifier may be trained by a training set and the training set may comprise history handover result data regarding the handover from the source cell to the target cell. The history handover result data may be obtained by the handover management entity in various ways. For example, the handover management entity may obtain the history handover result data from a network management device which can collect the history handover result data from the network node. In addition, the handover management entity may obtain the history handover result data from the network node.

In an embodiment, the training set may further comprise handover result data regarding the handover from the source cell to the target cell generated by a generative adversarial network (GAN). The GAN may be any suitable GAN either currently known or to be developed in the future.

Figure 3:
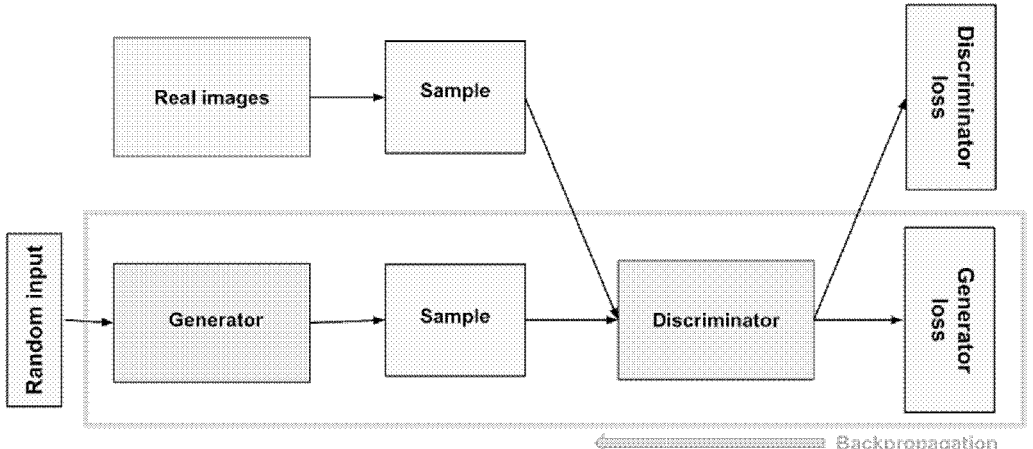
FIG. 3 shows an example of architecture of GAN.

FIG. 3 shows an example of architecture of GAN. As shown in FIG. 3, a generator of the GAN learns to create fake data by incorporating feedback from a discriminator. GAN learns to make the discriminator classify its output as real data. Generator training may require tighter integration between the generator and the discriminator than discriminator training requires. Training the generator may include:

A random input,

A generator network, which transforms the random input into a data instance,

A discriminator network, which classifies the generated data,

A discriminator output,

A generator loss, which penalizes the generator for failing to fool the discriminator.

The GAN may take random noise as its input. The generator may then transform this noise into a meaningful output. The generator loss penalizes the generator for producing a sample that the discriminator network classifies as fake. Back propagation adjusts each weight in the right direction by calculating the weight's impact on the output. Both the generator and the discriminator may be neural networks.

For example, a GAN trained on photographs can generate new photographs that look at least superficially authentic to human observers, having many realistic characteristics.

It is noted that the GAN as shown in FIG. 3 is only an example of GAN, and any other suitable GAN may be used in other embodiments. For example, a variational autoencoder (VAE) with a generative adversarial network (GAN) may be used, which is proposed by "Anders Boesen Lindbo Larsen, Søren Kaae Sønderby, Hugo Larochelle, and Ole Winther, Autoencoding beyond pixels using a learned similarity metric, in Proceedings of the 33rd International Conference on International Conference on Machine Learning-Volume 48 (ICML'16), pp. 1558-1566".

In an embodiment, for a specific type of handover result, a corresponding type of generative adversarial network may be trained by using the corresponding type of history handover result data regarding the handover from the source cell to the target cell. For example, when there are four types of handover results, there may be four types of GANs each of which may correspond to a different type of handover result.

In an embodiment, the handover result data comprises a position of a terminal device, a handover result, a source cell identifier, a target cell identifier, a wrong cell identifier when the terminal device being handed over to a wrong cell. In other embodiments, the handover result data may further comprise any other suitable data such as cell configuration information, antenna information, signal measurement data of the source cell, signal measurement data of the target cell, signal measurement data of the wrong cell, handover triggering condition (or handover triggering difficulty), etc.

In an embodiment, the handover result data may further comprise at least one of antenna information of the source cell, antenna information of the target cell, antenna information of the wrong cell, a relative position of the terminal device to the antenna of a source cell, a relative position of the terminal device to the antenna of the target cell, or a relative position of the terminal device to the antenna of the wrong cell. The antenna information may comprise data of antenna position and tilt of all cells in a geography area. Based on these antennas, two or more cells in the geography area may be set up. The antenna information may be manually input in a cell deployment phase or be collected from a report in case of active antenna system (AAS). The relative position of the terminal device to the antenna may be represented in various ways. For example, the relative position of the terminal device to the antenna may be represented by a current position coordinate of the terminal device, a static antenna position coordinate of the antenna, a static antenna tilt of the antenna, an angle between the terminal device and the antenna, a distance between the terminal device and the antenna.

In an embodiment, the handover result may comprise at least at least one of too late handover; too early handover; handover to a wrong cell; or handover success.

As described in 3GPP TS 36.300 V16.2.0, detection mechanisms for Too Late Handover, Too Early Handover and Handover to Wrong Cell may be carried out by a network node through the following:

[Too Late Handover]

If the UE attempts to re-establish the radio link connection in a cell that belongs to eNB B, indicating as the last source cell a cell belonging to eNB A, different from eNB B, then eNB B may report this event to eNB A by means of the RLF Indication Procedure. eNB A may then use information in the RLF INDICATION message to determine whether the failure occurred in the source cell.

[Too Early Handover]

If the target cell belongs to an eNB B different from the eNB A that controls the source cell, the eNB B may send a HANDOVER REPORT message indicating a Too Early Handover event to eNB A upon eNB B receives an RLF INDICATION message from eNB A and if eNB B has sent the UE CONTEXT RELEASE message to eNB A related to the completion of an incoming handover for the same UE within the last Tstore_UE_cntxt seconds or there exists a prepared handover for the same UE in eNB B.

[Handover to Wrong Cell]

If the type of the failure is Radio Link Failure and the target cell belongs to eNB B that is different from the eNB A that controls the source cell, the eNB B may send a HANDOVER REPORT message indicating a Handover To Wrong Cell event to eNB A upon eNB B receives an RLF INDICATION message from eNB C, and if eNB B has sent the UE CONTEXT RELEASE message to eNB A related to the completion of an incoming handover for the same UE within the last Tstore_UE_cntxt seconds or there exists a prepared handover for the same UE in eNB B. This also applies when eNB A and eNB C are the same. The HANDOVER REPORT message may also be sent if eNB B and eNB C are the same and the RLF Indication is internal to this eNB.

If the type of the failure is Handover Failure during a handover from a cell in eNB A, and the UE attempts to re-establish the radio link connection to a cell in eNB C, then eNB C may send a RLF INDICATION message to eNB A.

With reference to FIG. 2, at block 208, the handover management entity may generate a handover decision based on the predicted handover result. For example, depending on the specific type of the predicted handover result, the handover management entity may generate different handover decision.

As a first example, when the predicted handover result indicates too late handover, the handover decision may indicate the network node to stop handover and perform cell reselection. In addition, the handover decision may provide at least one recommended target cell for the network node to perform cell reselection.

As a second example, when the predicted handover result indicates too early handover and the handover management entity determines that the first terminal device will enter into a handover success area at a particular time point, the handover decision may indicate the network node to perform the handover at or after the particular time point. When the handover management entity determines that the first terminal device will enter into an area of handover to a wrong cell at a particular time point, the handover decision may indicate the network node to select the wrong cell and perform handover to the wrong cell at or after the particular time point.

As a third example, when the predicted handover result indicates handover to a wrong cell and the handover management entity determines that the first terminal device will enter into a handover success area at a particular time point, the handover decision may indicate the network node to perform the handover at or after the particular time point. When the handover management entity determines that the first terminal device is moving towards the wrong cell, the handover decision may indicate the network node to select the wrong cell and perform handover to the wrong cell.

As a fourth example, when the predicted handover result indicates too early handover and the handover management entity may monitor a real time position of the first terminal device, the handover management entity may send a handover decision comprising a handover command to the network node until the first terminal device enters into a handover success area.

In an embodiment, when the predicted handover result indicates too late handover, the handover decision indicates the network node to decrease a handover triggering difficulty. For example, the handover triggering difficulty can be set according to a legacy rule. For example, the inequality A3-1 (Entering condition) as described in 3GPP TS 38.331 V16.1.0 may be used.

Inequality A3-1 (Entering Condition):

$$Mn+Ofn+Ocn-Hys>Mp+Ofp+Ocp+Off$$

The variables in the inequality A3-1 are defined as follows:

Mn is the measurement result of the neighbouring cell, not taking into account any offsets.

Ofn is the measurement object specific offset of the reference signal of the neighbour cell (i.e. offsetMO as defined within measObjectNR corresponding to the neighbour cell).

Ocn is the cell specific offset of the neighbour cell (i.e. cellIndividualOffset as defined within measObjectNR corresponding to the frequency of the neighbour cell), and set to zero if not configured for the neighbour cell.

Mp is the measurement result of the SpCell, not taking into account any offsets.

Ofp is the measurement object specific offset of the SpCell (i.e. offsetMO as defined within measObjectNR corresponding to the SpCell).

Ocp is the cell specific offset of the SpCell (i.e. cellIndividualOffset as defined within measObjectNR corresponding to the SpCell), and is set to zero if not configured for the SpCell.

Hys is the hysteresis parameter for this event (i.e. hysteresis as defined within reportConfigNR for this event).

Off is the offset parameter for this event (i.e. a3-Offset as defined within reportConfigNR for this event).

Mn, Mp are expressed in dBm in case of RSRP (Reference Signal Receiving Power), or in dB in case of RSRQ (Reference Signal Receiving Quality) and RS-SINR (Reference Signal-Signal to Interference plus Noise Ratio).

Ofn, Ocn, Ofp, Ocp, Hys, Off are expressed in dB.

In this embodiment, the Ocp parameter may be decreased when the predicted handover result indicates too late handover. Alternatively, the Ocn parameter may be increased when the predicted handover result indicates too late handove. In this case, the handover may be easier to be triggered so that the possibility of the first terminal device entering into "too late segment" may be very low.

In an embodiment, the initial parameters set in above inequality A3-1 can be configured to make the inequality fulfilled more easily, which means the handover is easier to be triggered so that the possibility of UE entering into "too late segment" is very low.

In an embodiment, the initial parameters set in above inequality A3-1 can be configured according to the history handover result data for example in the handover success area and/or the too early handover area.

In an embodiment, when the predicted handover result indicates handover success, the handover decision indicates the network node to immediately perform the handover.

In an embodiment, when the predicted handover result indicates too early handover or handover to a wrong cell, the handover decision may be generated further based on the movement information of the first terminal device. In an embodiment, the movement information of the first terminal device may comprise at least one of a moving speed of the first terminal device; a moving direction of the first terminal device; or an acceleration of the first terminal device.

The movement information of the first terminal device may be used by the handover management entity to determine whether to continue the handover. For example, when the handover management entity predicts that the first terminal device will enter into a handover success area based on the movement information, it may determine to continue the handover. In this case the handover management entity may determine handover timing. For example, the handover management entity may predict a time that the first terminal device will enter into a handover success area and then determine the handover timing. When the handover management entity predicts that the first terminal device will enter into an area of handover to a wrong cell based on the movement information, it may determine to stop the handover. In this case the handover decision may indicate the network node to stop the handover and perform cell reselection. In addition, the handover management entity may provide at least one recommended target cell to the network node.

In an embodiment, when the predicted handover result indicates too early handover or handover to a wrong cell and the handover management entity determines that the first terminal device will enter into a handover success area at a particular time point, the handover decision indicates the network node the particular time point for performing the handover.

In an embodiment, when the predicted handover result indicates too early handover or handover to a wrong cell and the handover management entity determines that the first terminal device will enter into a handover success area at a particular time point, the handover decision indicates the network node to perform the handover, wherein the response comprising the handover decision is sent to the network node at or after the particular time point; or In an embodiment, when the predicted handover result indicates too early handover or handover to a wrong cell and the handover management entity determines that the first terminal device is moving far away from a handover success area, the handover decision comprises at least one recommended target cell and indicates the network node to perform cell reselection based on the at least one recommended target cell.

At block 210, the handover management entity may send a handover response comprising the handover decision to the network node.

FIG. 4 shows a flowchart of a method 400 according to another embodiment of the present disclosure, which may be performed by an apparatus implemented in or at or as the handover management entity or communicatively coupled to the handover management entity. For some parts which have been described in the above embodiments, the description thereof is omitted here for brevity.

At block 402, the handover management entity may receive at least a part of history handover result data from the network node.

At block 404, the handover management entity may receive a handover request from a network node. The handover request indicates that a first terminal device is to be handed over from a source cell to a target cell. Block 404 is same as block 202 of FIG. 2.

At block 406, the handover management entity may obtain a position of the first terminal device. Block 406 is same as block 204 of FIG. 2.

At block 408, the handover management entity may obtain the movement information of the first terminal device. Blocks 406 and 408 may be performed in one step.

At block 410, the handover management entity may determine at least one handover result area regarding the handover from the source cell to the target cell. In an embodiment, the at least one handover result area regarding the handover from the source cell to the target cell may be determined based on the history handover result data regarding the handover from the source cell to the target cell. In another embodiment, the at least one handover result area regarding the handover from the source cell to the target cell may be determined by using the classifier and/or the generative adversarial network.

For example, the handover management entity may divide the whole handover area between a pair of source and target cells into different segments (or areas), such as "too early handover" segment, "too late handover" segment, "handover to wrong cell" segment, and "handover OK (or success)" segment based on the handover result (such as OK or the identified handover problems) as well as the position of the UE when it executes the handover.

At block 412, the handover management entity may predict a handover result of the first terminal device by a classifier. The position of the first terminal device is used as an input of the classifier and the classifier is trained for the handover from the source cell to the target cell. Block 412 is same as block 206 of FIG. 2.

At block 414, the handover management entity may generate a handover decision based on the predicted handover result. Block 414 is same as block 208 of FIG. 2.

At block 416, the handover management entity may send a handover response comprising the handover decision to the network node. Block 416 is same as block 210 of FIG. 2.

In an embodiment, the handover management entity may be deployed into an open radio access network (O-RAN).

FIG. 5 shows a flowchart of a method 500 according to another embodiment of the present disclosure, which may be performed by an apparatus implemented in or at or as a network node or communicatively coupled to the network node. As such, the apparatus may provide means or modules for performing various operations of the method 500 as well as means or modules for performing other operations in conjunction with other components. For some parts which have been described in the above embodiments, the description thereof is omitted here for brevity.

At block 502, optionally, the network node may send at least a part of history handover result data to the handover management entity. For example, when the network node detects the handover result, it may send the handover result data to the handover management entity.

At block 504, the network node may send a handover request to a handover management entity. The handover request indicates that a first terminal device is to be handed over from a source cell to a target cell.

At block 506, the network node may receive a handover response comprising a handover decision from the handover management entity. The handover decision is generated based on a predicted handover result of the first terminal device and the predicted handover result of the first terminal device is predicted by a classifier. A position of the first terminal device is used as an input of the classifier and the classifier is trained for the handover from the source cell to the target cell.

Figure 6:
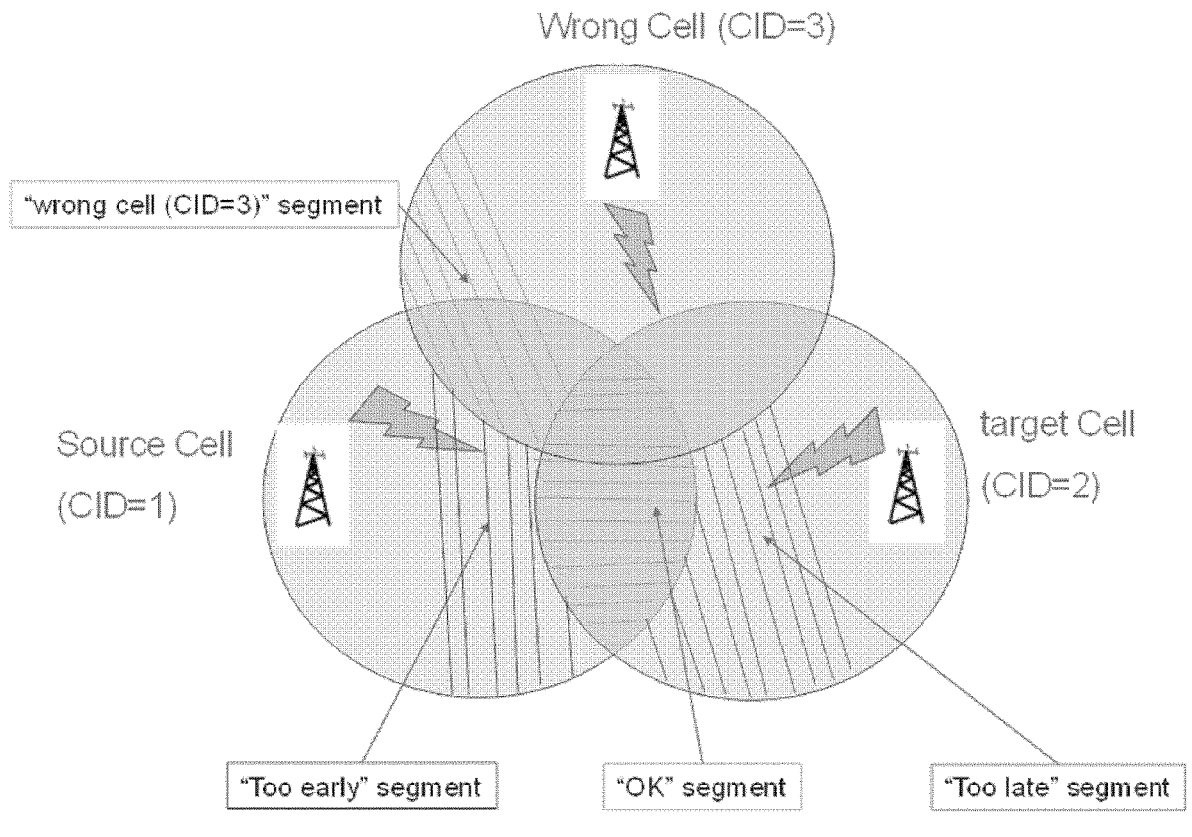
FIG. 6 illustrates an example of handover area segmentation according to an embodiment of the present disclosure.

FIG. 6 illustrates an example of handover area segmentation according to an embodiment of the present disclosure.

Detailed steps of handover area segmentation for a pair of source and target cells may be as following. When a source or serving cell decide to trigger a UE handover, it may report this event (e.g., the UE is to be handed over from a source cell to a target cell) to a GMC (Global MRO Commander) (also called the handover management entity). GMC may inquire the real-time UE position immediately (e.g., at handover execution). The source cell may report a handover result, e.g., either "handover OK", "too early handover", "too late handover", or "Handover to wrong cell" to GMC based on legacy MRO rules and procedure. If the identified problem is "Handover to wrong cell", the cell identifier (CID) of the wrong cell should be enclosed. GMC may label each handover position with a corresponding handover result as a real image (e.g., real handover positions). For the "Handover to wrong cell" problem, the CID of "wrong cell" should be a part of the label, which means different wrong cells may have different labels.

After collecting enough "real images (e.g., real handover positions)" for a type of handover result (which means these "real images" share a same label), for example, after the GMC collects more than 1000 "real images" for the "too early handover" problem, the GMC may start to setup and train a GAN model to generate a set of "fake images (e.g., virtual handover positions)" mapping to the handover result (i.e., too early handover).

For the images of "Handover to wrong cell", since different wrong cells may have different labels (e.g., the CIDs of wrong cells), GAN model may be set up and trained separately so that the sets of fake images for such handover problems may be generated separately and mapped to different wrong cells.

For each type of handover (HO) result, GMC may combine both real and fake images together and label them with a corresponding type of HO result to form a training set. GMC may use such training set to train a multi-class classifier to classify or predict HO result segment. For the multi-class classifier, its input vector may be the UE's HO position and its output vector may be a HO result segment. Finally, for a pair of source and target cells, the HO result segments may be formed.

After the multi-class classifier for a specific pair of source and target cells is trained, when a handover is triggered in the source cell, the source cell may request the GMC to provide a handover decision (such as the handover timing) rather than do it by itself. After GMC receives the handover request, it may start to monitor the UE, such as inquiring the UE's real time position, moving speed and direction and then predict the HO result segment for example by using the multi-class classifier and/or the moving speed and direction.

For example, the handover triggering condition can be set according to a legacy rule, e.g. the Inequality A3-1 (Entering condition) as described above.

GMC may decide handover timing based on the prediction result (e.g., the HO result segment that UE belongs to at the time of triggered handover). If the UE's current position belongs to the "too early handover" segment, no handover command may be sent by the GMC until the UE enters into the handover OK segment. If the UE's current position belongs to the "too late handover" segment, GMC may notify the source cell to decrease the handover triggering difficulty. If the UE's current position belongs to the "handover to wrong cell" segment, GMC may check the UE's moving speed and direction. If the UE is moving close to the handover OK segment according to its moving speed and direction, no handover command may be sent until the UE enters into the handover OK segment. If the UE is moving far away from the handover OK segment, GMC may return a list of CIDs of candidate target cells to the source cell for target cell reselection. If the UE's current position belongs to the handover OK segment, GMC may send a handover command to the source cell immediately, which means that the handover timing is now.

Figure 7A:
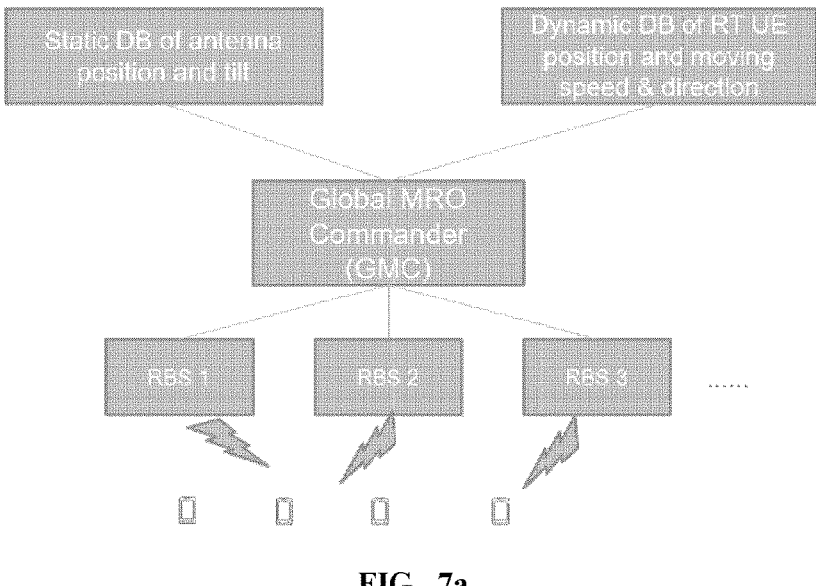
FIG. 7a illustrates an example of architecture of GAN based MRO according to an embodiment of the present disclosure.
Figure 7B:
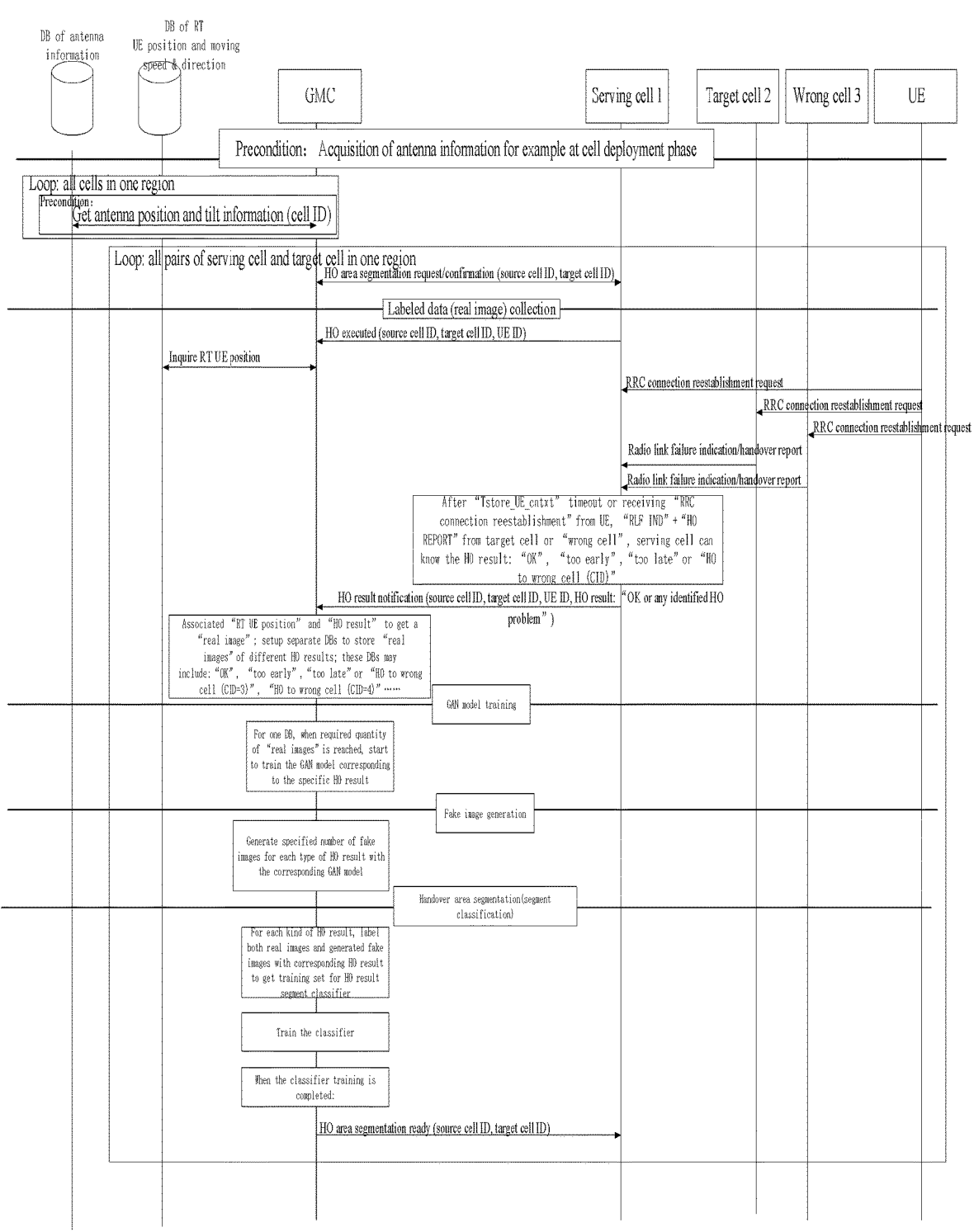
FIG. 7b shows a flowchart of GAN based MRO according to an embodiment of the present disclosure.
Figure 7C:
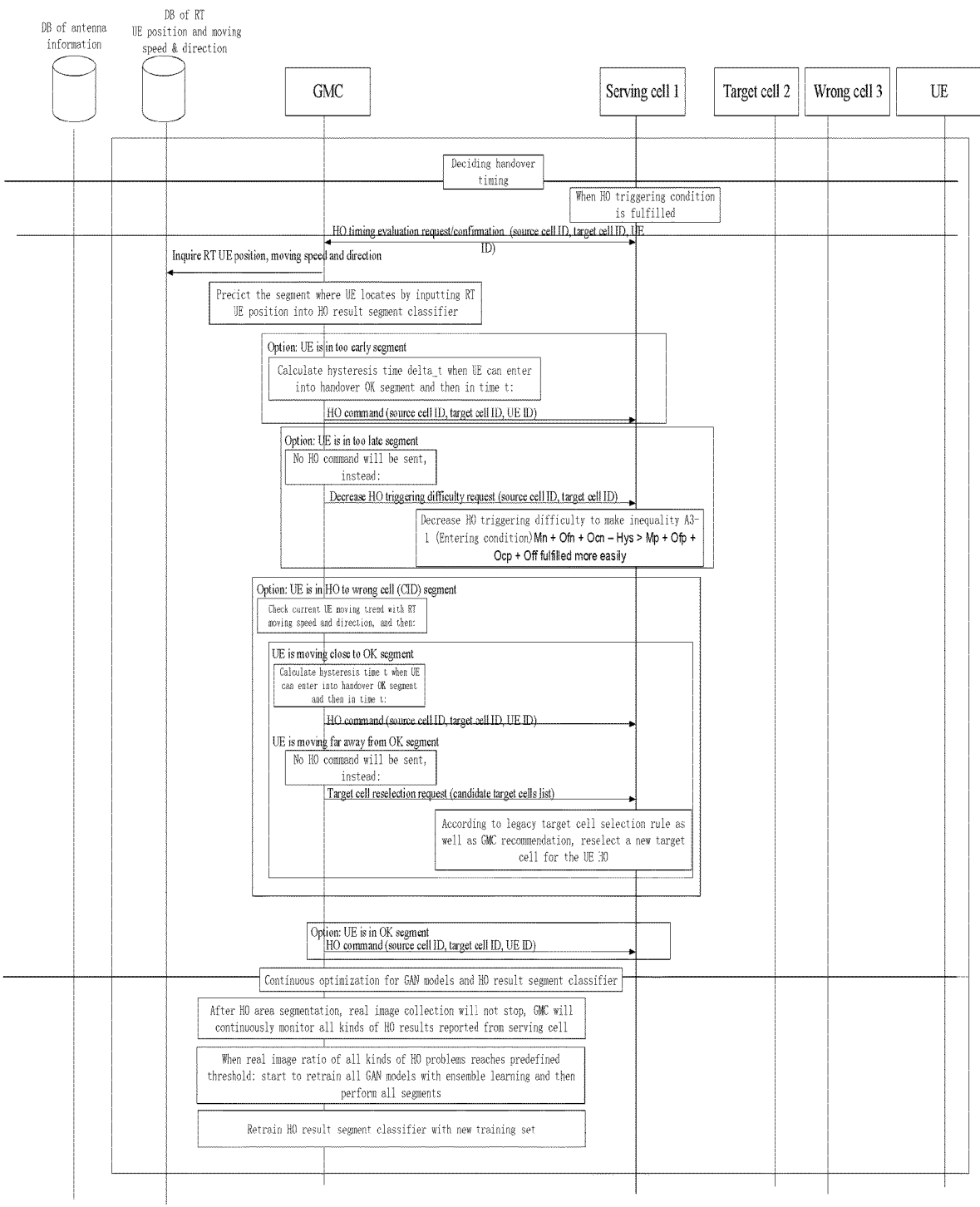
FIG. 7c shows a flowchart of GAN based MRO according to another embodiment of the present disclosure.

FIG. 7a illustrates an example of architecture of GAN based MRO according to an embodiment of the present disclosure. FIG. 7b shows a flowchart of GAN based MRO according to an embodiment of the present disclosure. FIG. 7c shows a flowchart of GAN based MRO according to another embodiment of the present disclosure.

As shown in FIG. 7a, the architecture may comprise a function entity of static database (DB) of antenna position and tilt. The function entity of static DB of antenna position and tilt may be used to store data of antenna position and tilt of at least one cell in a geography area. Based on these antennas, the at least one cell may be set up. As shown in FIG. 7b, the data of the DB of antenna position and tilt may come from manual input in a cell deployment phase or a report in case of AAS. If needed, the DB of antenna position and tilt may provide antenna position and tilt information of a specific cell to GMC.

The architecture may further comprise a function entity of dynamic DB of real time (RT) UE position and moving speed & direction. The function entity of dynamic DB of RT UE position and moving speed & direction may provide an Application Programming Interface (API) to GMC. By using the API, GMC may retrieve the real-time position and moving speed (i.e., velocity vector $\vec{V}$) of the UE at any time. The data of the dynamic DB of RT UE position and moving speed & direction may come from the UE's positioning system such as GPS.

The architecture may further comprise a function entity of GMC. The function entity of GMC may implement some tasks, such as labeled data (e.g., real image or history handover result data) collection, GAN model training, fake image generation, handover area segmentation (segment classification), handover timing decision, and continuous optimization for GAN models and HO result segment classifier.

As shown in FIG. 7b, when a serving cell (i.e., source cell) plans to activate the MRO function, it may request GMC to do HO area segmentation for a specific HO area which can be defined by a pair of source and target cells. It means that at least one of the above tasks may be executed for the pair of source and target cells.

As shown in FIG. 7b, the procedure of labeled data (real image) collection may be as following.

Step 1: when a UE HO is executed by a source cell, it may report the UE HO event to GMC. The UE HO event may comprise a source CID, a target CID and a UE ID (identifier), etc.

Step 2: GMC may inquire the RT UE position from the dynamic DB of RT UE position and moving speed & direction.

Step 3: according to legacy MRO rules and definitions, after getting HO result from a target cell or a wrong cell, the source cell may send a report of the HO result to GMC. The report of the HO result may include a source CID, a target CID, a UE ID and a HO result identified by the source cell. The report of the HO result may further include a wrong CID when the UE is handed over to a wrong cell. The HO result may include: "handover OK", "too early handover", "too late handover" or "HO to wrong cell".

Step 4: GMC may associate the RT UE position and the HO result to form a real image. Then GMC may setup separate DBs to store the real images of different HO results, which means that these DBs may be set up for each type of HO result.

As shown in FIG. 7b, the procedure of GAN model training may be as following. The GAN model may be trained for each pair of source and target cells. For any DB, when the required number of real images for a specific type of HO result for a specific pair of source and target cells is reached, GMC may start to train a GAN model corresponding to the specific type of HO result for the specific pair of source and target cells, which implies that the number of GAN models may match with the number of HO result types.

Since a traditional GAN model may use a random noise as an input to generate a fake image, it may make the generated fake images have larger divergence from the real images, which may further lead GMC to calculate a wrong HO timing. In order to make HO timing decision as accurate as possible (i.e. the fake images are as close to real images as possible), VAE-GAN (Variational Autoencoder-Generative Adversarial Networks) may be used.

Figure 8:
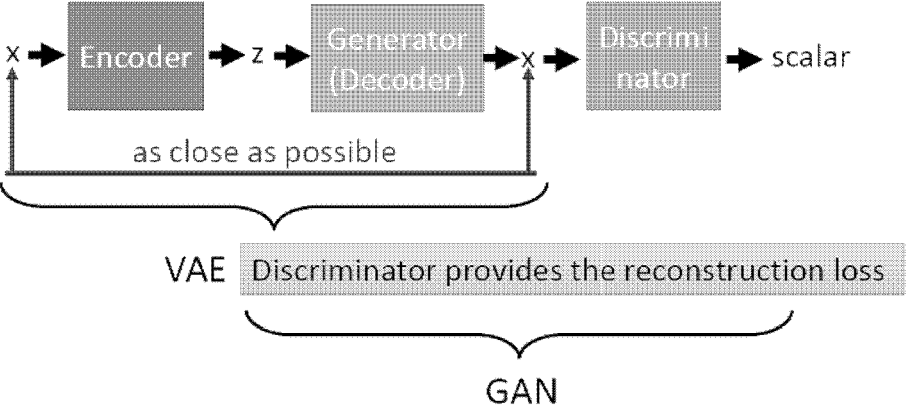
FIG. 8 shows an example of VAE-GAN working flow according to an embodiment of the present disclosure.

FIG. 8 shows an example of VAE-GAN working flow according to an embodiment of the present disclosure. Compared to the traditional GAN, VAE-GAN connects an Encoder before a Generator, the Encoder may output an Embedding Code z based on a real image x. And then based on the Embedding Code z instead of random noise, the Generator may output the final fake image x'. The fake image x' is required to be as close to the real one x as possible.

With reference to FIG. 7b, the procedure of fake image generation may be as following. GMC may use the selected GAN model to generate a specified number of fake images for each type of HO result.

With reference to FIG. 7b, the procedure of handover area segmentation may be as following.

Step 1: GMC may combine both the real images and the generated fake images together for a specific pair of source and target cells, and label a specific HO result to generate a training set for a HO result segment classifier. The classifier may be a multi-class classifier.

Step 2: GMC may train the classifier with a machine learning (ML) algorithm by using the training set for the specific pair of source and target cells.

Step 3: When the training of the classifier is completed, GMC may notify the source cell which has requested the handover area segmentation.

With reference to FIG. 7c, the procedure of deciding handover timing may be as following.

Step 1: When the HO triggering condition of a UE is fulfilled, the source cell may request GMC to evaluate the handover timing.

Step 2: GMC may inquire the RT position, moving speed and direction of the UE from the dynamic DB of RT UE position and moving speed & direction.

Step 3: GMC may predict the HO result segment for the UE by inputting the RT UE position into the HO result segment classifier.

If the current UE position belongs to a too early handover segment, GMC may calculate a hysteresis time $\Delta t$ with the following formula (1). After $\Delta t$, the UE can enter into a "handover OK" segment.

$$\Delta t = avg_{(P_i \in OK\_Seg)}\left\{|P_i \rightleftharpoons P_0|\cos\theta_I \Big/ |\vec{V}_0|\right\} \quad (1)$$

Where $P_i$ is the position of the $i^{th}$ image in "handover OK" segment (including both real and fake images), $P_0$ is the RT UE position, $\vec{V}_0$ is the RT UE moving speed vector, $\theta_i$ is the angle between $(P_i \dot{-} P_0)$ and $\vec{V}_0$.

Figure 9:
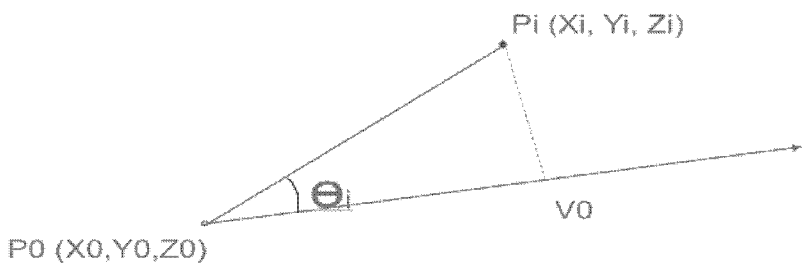
FIG. 9 shows an example of RT UE position, moving speed and direction according to an embodiment of the present disclosure.

FIG. 9 shows an example of RT UE position, moving speed and direction according to an embodiment of the present disclosure.

If the current UE position belongs to a too late handover segment, GMC may notify a source cell to decrease handover triggering difficulty as legacy.

If the current UE position belongs to a handover to wrong cell segment, GMC may check the UE's moving trend (e.g., moving speed and direction). If the UE is moving close to a handover OK segment according to the UE's moving trend. The GMC may follow the handling same as the too early handover case. If the UE is moving far away from a handover OK segment, GMC may return a list of CIDs of candidate target cells to the source cell. The candidate target cells may include multiple wrong cells for example due to segment overlap.

An expected output from the HO result segment classifier may be a likelihood of each class, so that GMC can select the N most likely wrong cells with close likelihoods as the candidate target cells.

Figure 10:
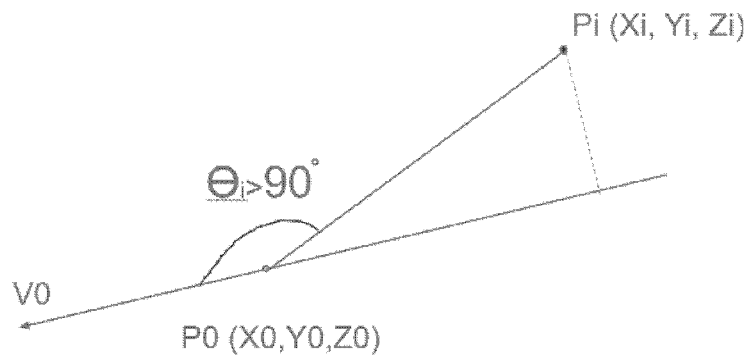
FIG. 10 shows an example of UE being moving far away from a handover OK segment according to an embodiment of the present disclosure.

FIG. 10 shows an example of UE being moving far away from a handover OK segment according to an embodiment of the present disclosure. From formula (1), if the calculated $\Delta t < 0$, GMC can know UE is moving far away from the handover OK segment, otherwise the UE is moving close to the handover OK segment. If UE is moving far away from the handover OK segment, the $\theta_i$ in formula (1) may be larger than 90°. If the current UE position belongs to the handover OK segment, GMC may send a handover command to the source cell immediately, which means that the handover timing is now.

With reference to FIG. 7c, the GAN models and HO result segment classifier may be continuously optimized. For example, after HO area segmentation, the real image (i.e., history handover result data) collection may not stop. GMC may continuously monitor all kinds of HO results reported from the source cell. When a ratio of total real images of all kinds of HO problems against the ones of handover OK result reaches a predefined threshold, GMC may start to retrain the GAN models with ensemble learning and then reform the HO area segments. During ensemble learning, GMC may keep the original real images but discard the original fake images. After the new HO area segmentation is completed, GMC may continue to retrain HO result segment classifier with a new training set.

FIG. 11 shows a flowchart of GMC working flow according to an embodiment of the present disclosure. The GMC working flow may comprise GAN model setup and training, fake image generation, HO area segmentation, deciding handover timing. The detailed GMC working flow has been described in the above embodiments.

The image dimension (or feature) of an input vector of GAN and/or classifier may be related to the UE's position, which may include the UE's coordinate (x, y, z) representing the UE's absolution position, and a distance and angle (d, θ) between the UE and antenna positions of at least one cells in a geographic region, which may represent the UE's relative position to the antennas of at least one cell in the geographic region.

Figure 12:
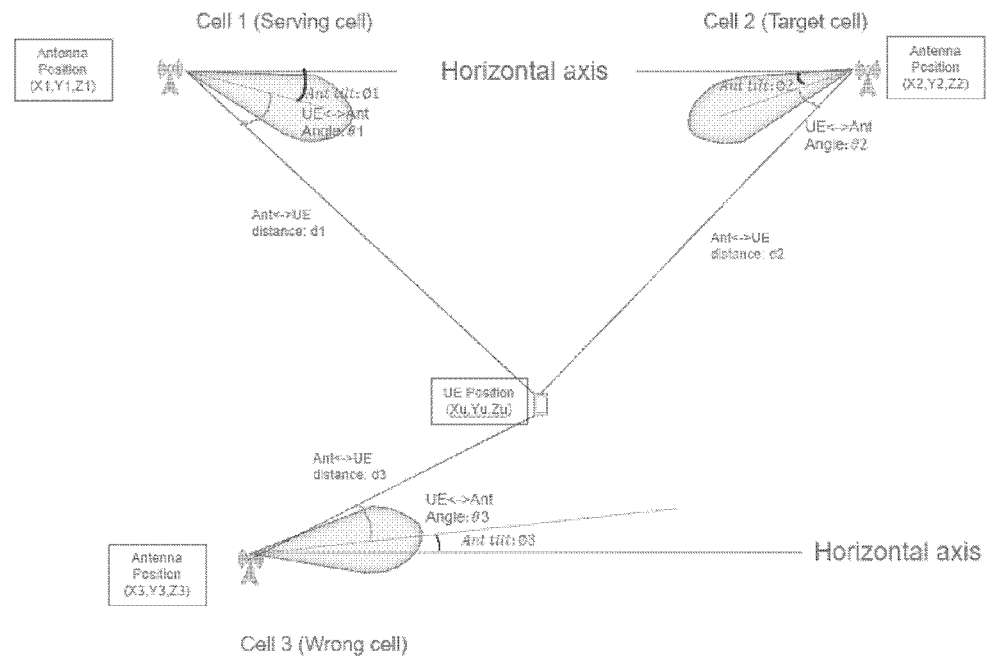
FIG. 12 shows an example of input vector dimensions for both the GAN models and the HO result segment classifier according to an embodiment of the present disclosure.

FIG. 12 shows an example of input vector dimensions for both the GAN models and the HO result segment classifier according to an embodiment of the present disclosure.

Suppose in a geographic region, there are total N deployed cells, then the input vector of image for a specific pair of source and target cells may have the features like: (Xu, Yu, Zu, X1, Y1, Z1, Ø1, θ1, d1, X2, Y2, Z2, Ø2, θ2, d2, X3, Y3, Z3, Ø3, θ3, d3, . . . . Xn, Yn, Zn, Øn, θn, dn)

(Xu, Yu, Zu): UE's current position coordinate;

(Xn, Yn, Zn): Static antenna position coordinate of the nth cell;

Øn: Static antenna tilt of the nth cell;

θn: The angle between UE and the antenna of the nth cell;

dn: The distance between UE and the antenna of the nth cell.

Both GAN models and the HO result segment classifier may have the same input vector dimensions.

For GAN models, an output vector may be a set of fake images which may have the same dimensions as the input vector. While for the HO result segment classifier, the dimensions of output vectors may be likelihoods of all handover result segment classes, e.g. "handover OK segment", "too early handover segment", "too late handover segment", "handover to wrong cell segment".

For "handover OK", "too early handover", "too late handover", GMC may use the predicted handover segment (e.g., HO result) with the largest likelihood to decide HO timing. For "handover to wrong cell", GMC may use multiple classes' likelihoods to decide the recommended candidate target cell list in case that their likelihoods are very close to each other (corresponding to the case that a UE is locating the overlapped area of multiple "wrong cells"). Then the source cell can reselect a new target cell to do UE HO based on GMC's recommendation as well as legacy rules.

Figure 13:
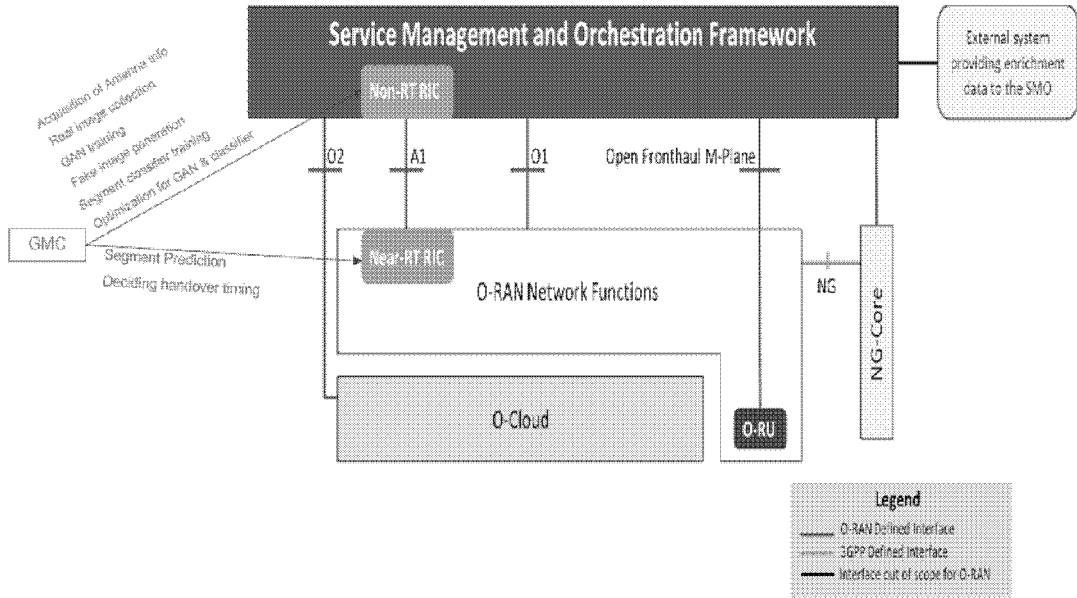
FIG. 13 shows an example of GMC deployed into ORAN to implement traffic steering according to an embodiment of the present disclosure.

FIG. 13 shows an example of GMC deployed into ORAN to implement traffic steering according to an embodiment of the present disclosure. The network elements except the GMC as shown in FIG. 13 are same as the corresponding network elements as described in O-RAN-WG1-O-RAN Architecture Description—v01.00.00, the disclosure of which is incorporated by reference herein in their entirety.

As shown in FIG. 13, the GMC may be deployed into ORAN architecture for traffic steering. The implementation of GMC can be distributed into non-real-time RAN Intelligent Controller (Non-RT RIC) and near-real-time RAN Intelligent Controller (Near-RT RIC) or Network Management System (NMS). The Non-RT RIC may implement a part of function such as acquisition of antenna info; real image collection; GAN training; fake image generation; segment classifier training; and optimization for GAN & classifier. The Near-RT RIC or NMS implement a part of function such as handover segment prediction and deciding handover timing.

Figure 14:
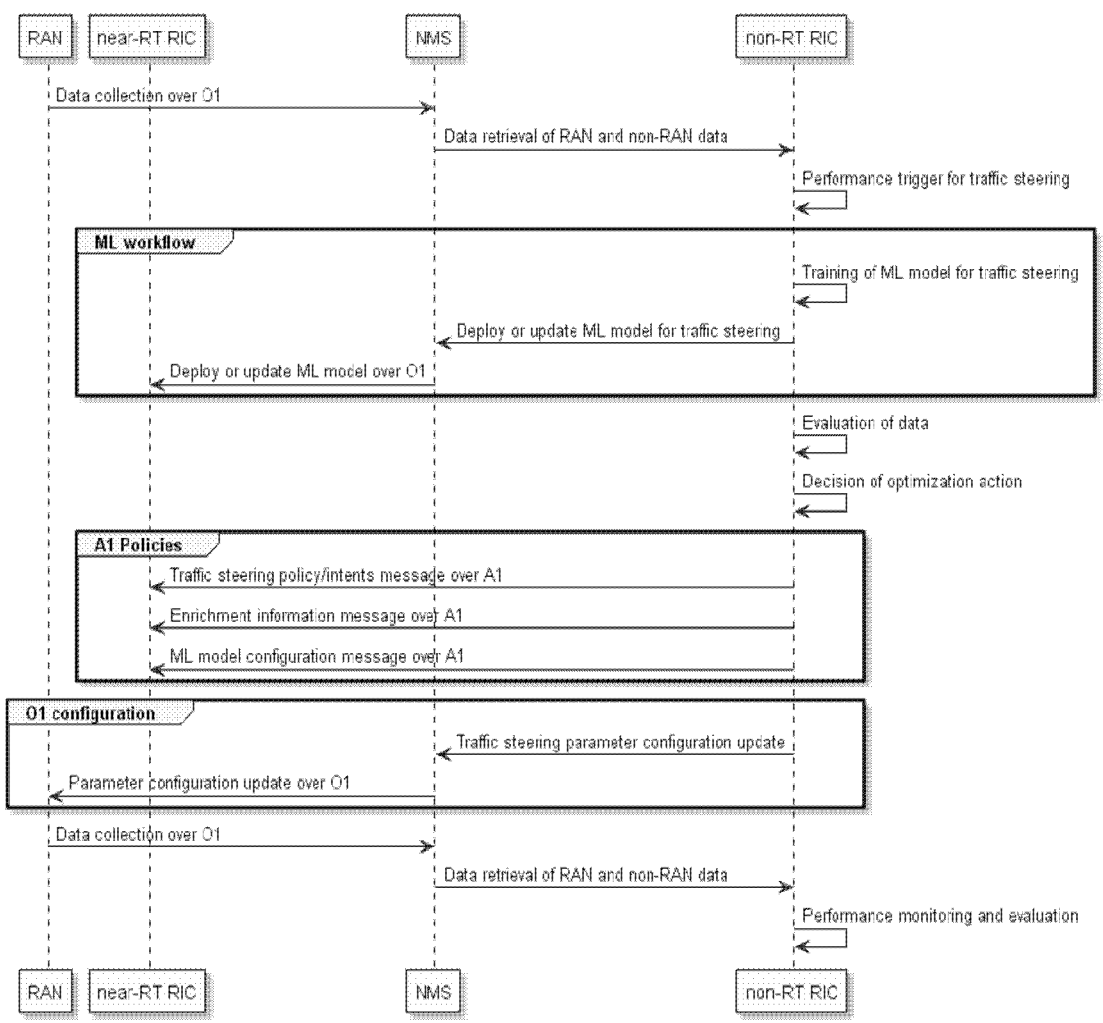
FIG. 14 shows an example of traffic steering use case flow diagram according to an embodiment of the present disclosure.

FIG. 14 shows an example of traffic steering use case flow diagram according to an embodiment of the present disclosure. The traffic steering use case flow diagram is same as FIG. 3.1.3-1 of "ORAN-WG2. Use Case Requirements v01.00", the disclosure of which is incorporated by reference herein in their entirety.

Figure 15:
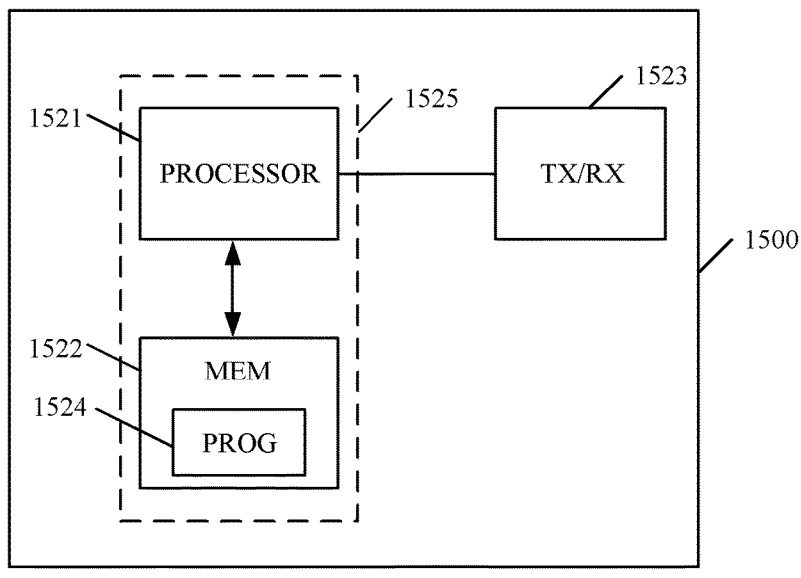
FIG. 15 is a block diagram showing an apparatus suitable for practicing some embodiments of the disclosure.

FIG. 15 is a block diagram showing an apparatus suitable for practicing some embodiments of the disclosure. For example, any one of the handover management entity and the network node as described above may be implemented as or through the apparatus 1500.

The apparatus 1500 comprises at least one processor 1521, such as a DP (digital processor), and at least one MEM (memory) 1522 coupled to the processor 1521. The apparatus 1520 may further comprise a transmitter (TX) and receiver (RX) 1523 coupled to the processor 1521. The MEM 1522 stores a PROG (program) 1524. The PROG 1524 may include instructions that, when executed on the associated processor 1521, enable the apparatus 1520 to operate in accordance with the embodiments of the present disclosure. A combination of the at least one processor 1521 and the at least one MEM 1522 may form processing means 1525 adapted to implement various embodiments of the present disclosure.

Various embodiments of the present disclosure may be implemented by computer program executable by one or more of the processor 1521, software, firmware, hardware or in a combination thereof.

The MEM 1522 may be of any type suitable to the local technical environment and may be implemented using any suitable data storage technology, such as semiconductor based memory devices, magnetic memory devices and systems, optical memory devices and systems, fixed memories and removable memories, as non-limiting examples.

The processor 1521 may be of any type suitable to the local technical environment, and may include one or more of general purpose computers, special purpose computers, microprocessors, digital signal processors DSPs (digital signal processors) and processors based on multicore processor architecture, as non-limiting examples.

In an embodiment where the apparatus is implemented as or at the handover management entity, the memory 1522 contains instructions executable by the processor 1521, whereby the handover management entity operates according to any of the methods related to the handover management entity as described above.

In an embodiment where the apparatus is implemented as or at the network node, the memory 1522 contains instructions executable by the processor 1521, whereby the network node operates according to any of the methods related to the network node as described above.

Figure 16:
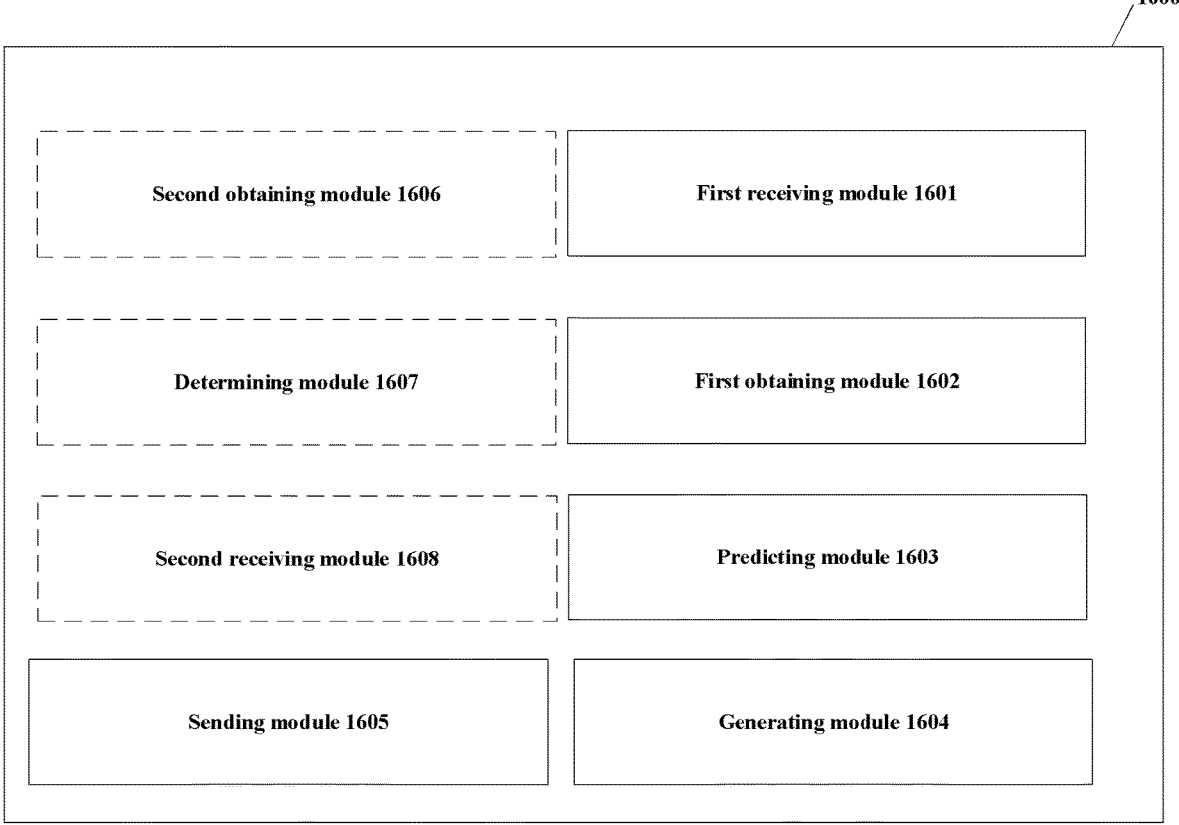
FIG. 16 is a block diagram showing a handover management entity according to an embodiment of the disclosure.

FIG. 16 is a block diagram showing a handover management entity according to an embodiment of the disclosure. As shown, the handover management entity 1600 comprises a first receiving module 1601, a first obtaining module 1602, a predicting module 1603, a generating module 1604, and a sending module 1605. The first receiving module 1601 may be configured to receive a handover request from a network node, wherein the handover request indicates that a first terminal device is to be handed over from a source cell to a target cell. The obtaining module 1602 may be configured to obtain a position of the first terminal device. The predicting module 1603 may be configured to predict a handover result of the first terminal device by a classifier, wherein the position of the first terminal device is used as an input of the classifier and the classifier is trained for the handover from the source cell to the target cell. The generating module 1604 may be configured to generate a handover decision based on the predicted handover result. The sending module 1605 may be configured to send a handover response comprising the handover decision to the network node.

In an embodiment, the handover management entity 1600 may further comprise a second obtaining module 1606 configured to obtain the movement information of the first terminal device.

In an embodiment, the handover management entity 1600 may further comprise a determining module 1607 configured to determine at least one handover result area regarding the handover from the source cell to the target cell.

In an embodiment, the handover management entity 1600 may further comprise a second receiving module 1608 configured to receive at least a part of history handover result data from the network node.

Figure 17:
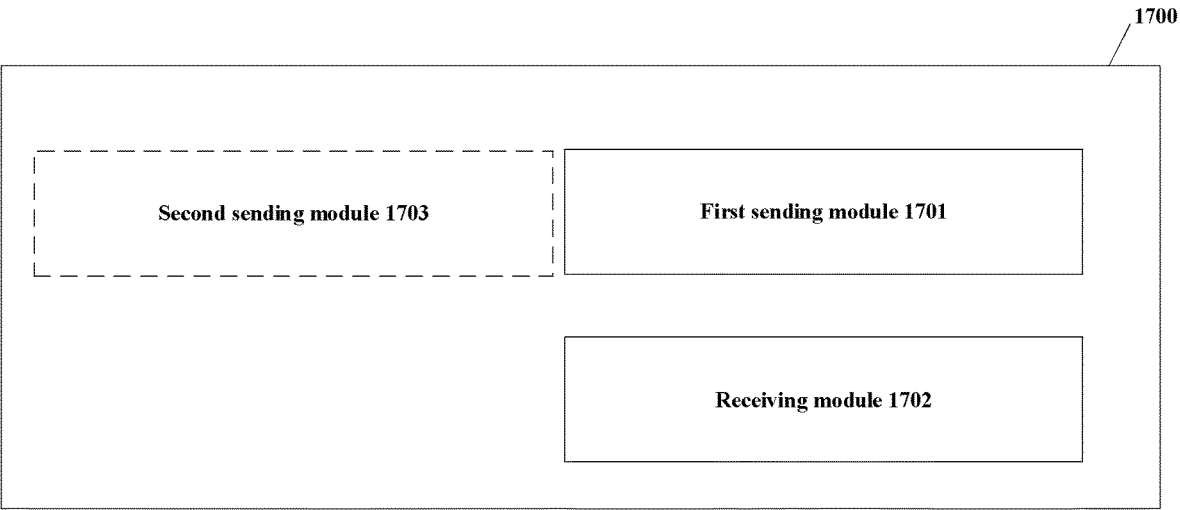
FIG. 17 is a block diagram showing a network node according to an embodiment of the disclosure.

FIG. 17 is a block diagram showing a network node according to an embodiment of the disclosure. As shown, the network node 1700 comprises a first sending module 1701 and a receiving module 1702. The first sending module 1701 may be configured to send a handover request to a handover management entity, wherein the handover request indicates that a first terminal device is to be handed over from a source cell to a target cell. The receiving module 1702 may be configured to receive a handover response comprising a handover decision from the handover management entity. The handover decision is generated based on a predicted handover result of the first terminal device and the predicted handover result of the first terminal device is predicted by a classifier. A position of the first terminal device is used as an input of the classifier and the classifier is trained for the handover from the source cell to the target cell.

In an embodiment, the network node 1700 comprises a second sending module 1703 configured to send at least a part of history handover result data to the handover management entity.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

With function units, the handover management entity or the network node may not need a fixed processor or memory. The introduction of virtualization technology and network computing technology may improve the usage efficiency of the network resources and the flexibility of the network.

Various embodiments herein offer various advantages, of which a non-exhaustive list of examples follows. In some embodiments herein, the proposed solution may not need the intervention of the network operators. The proposed solution may not rely on any prior MRO parameter setting which can only be provided by the network operators who have rich network tuning experience. For example, the initial CIO parameter can be set randomly. Instead, MRO related work such as deciding handover timing, adjusting HO trigger threshold, etc. may be done by the handover management entity automatically. In some embodiments herein, the proposed solution may satisfy most UEs or all of UEs with different handover problems. For example, different from the legacy MRO solution where each parameter (e.g., CIO) adjustment may only satisfy a part of UEs but not most UEs with different handover problems in the network. Instead, the proposed solution can satisfy most UEs or all of UEs. In some embodiments herein, the proposed solution can solve or mitigate the oscillation issue of optimization parameter (e.g., CIO). For example, in the legacy MRO solution, the optimization parameter (e.g., CIO) could be oscillating depending on the percentage of each handover problem in different adjustment periods, while the proposed solution may solve or mitigate the oscillation issue of optimization parameter. The embodiments herein are not limited to the features and advantages mentioned above. A person skilled in the art will recognize additional features and advantages upon reading the following detailed description.

According to various embodiments, a new method based on GAN to implement intelligent MRO is proposed. The proposed method may not need the network operator to input any prior parameter (e.g., the initial CIO parameter can be set randomly). In addition, the proposed method can satisfy most UEs or all of UEs which will be handed over from a specific serving cell to target cell.

Further, the exemplary overall commutation system including the terminal device and the network node such as base station will be introduced as below.

Embodiments of the present disclosure provide a communication system including a host computer including: processing circuitry configured to provide user data; and a communication interface configured to forward the user data to a cellular network for transmission to a terminal device. The cellular network includes a base station above mentioned, and/or the terminal device is above mentioned.

In embodiments of the present disclosure, the system further includes the terminal device, wherein the terminal device is configured to communicate with the base station.

In embodiments of the present disclosure, the processing circuitry of the host computer is configured to execute a host application, thereby providing the user data; and the terminal device includes processing circuitry configured to execute a client application associated with the host application.

Embodiments of the present disclosure also provide a communication system including a host computer including: a communication interface configured to receive user data originating from a transmission from a terminal device; a base station. The transmission is from the terminal device to the base station. The base station is above mentioned, and/or the terminal device is above mentioned.

In embodiments of the present disclosure, the processing circuitry of the host computer is configured to execute a host application. The terminal device is configured to execute a client application associated with the host application, thereby providing the user data to be received by the host computer.

Figure 18:
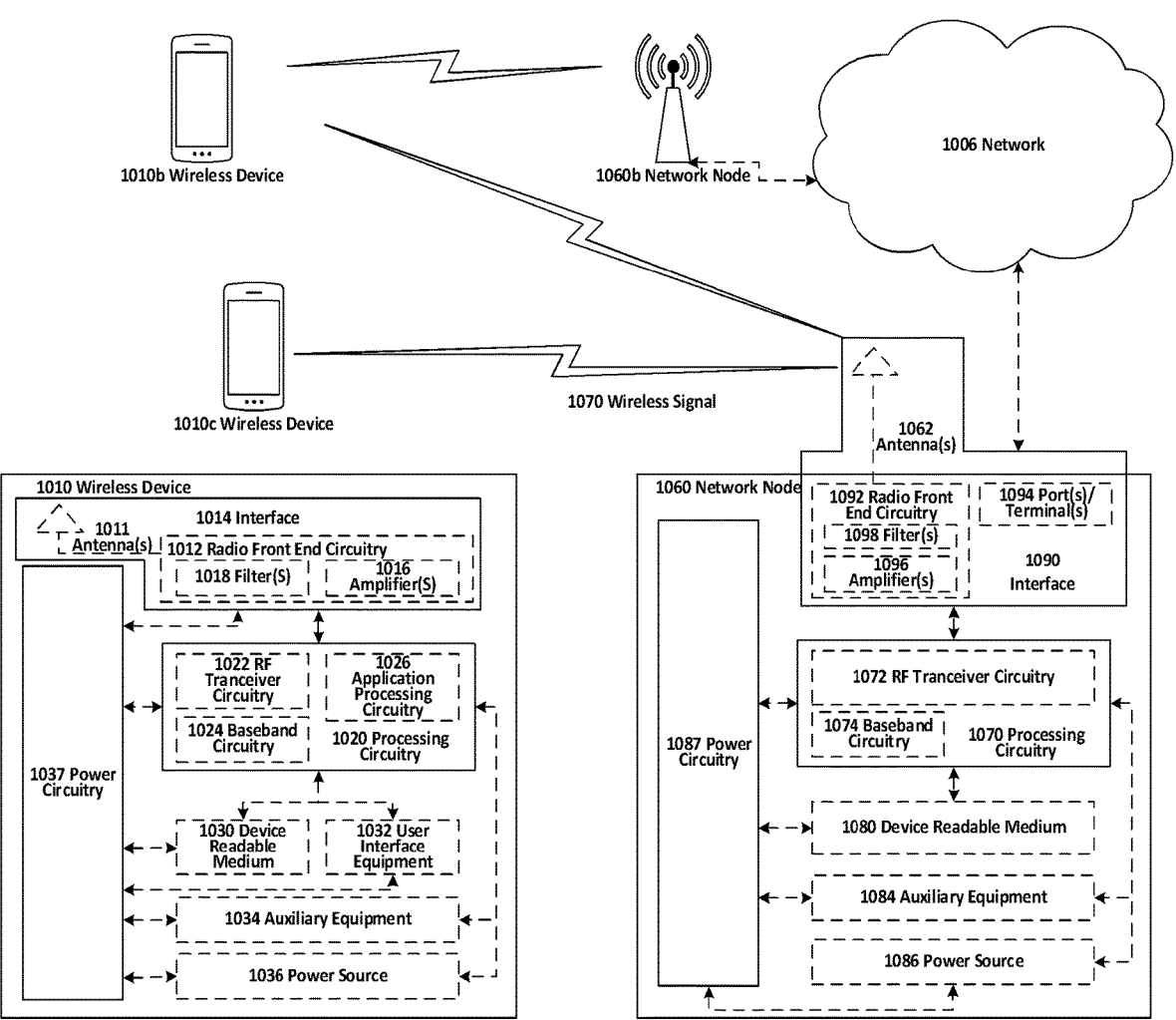
FIG. 18 is a schematic showing a wireless network in accordance with some embodiments.

FIG. 18 is a schematic showing a wireless network in accordance with some embodiments.

Although the subject matter described herein may be implemented in any appropriate type of system using any suitable components, the embodiments disclosed herein are described in relation to a wireless network, such as the example wireless network illustrated in FIG. 18. For simplicity, the wireless network of FIG. 18 only depicts network 1006, network nodes 1060 (corresponding to network side node) and 1060b, and WDs (corresponding to terminal device) 1010, 1010b, and 1010c. In practice, a wireless network may further include any additional elements suitable to support communication between wireless devices or between a wireless device and another communication device, such as a landline telephone, a service provider, or any other network node or end device. Of the illustrated components, network node 1060 and wireless device (WD) 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 1006 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 1060 and WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 18, network node 1060 includes processing circuitry 1070, device readable medium 1080, interface 1090, auxiliary equipment 1084, power source 1086, power circuitry 1087, and antenna 1062. Although network node 1060 illustrated in the example wireless network of FIG. 18 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 1060 are depicted as single boxes located within a larger box, or nested within multiple boxes, in practice, a network node may comprise multiple different physical components that make up a single illustrated component (e.g., device readable medium 1080 may comprise multiple separate hard drives as well as multiple RAM modules).

Similarly, network node 1060 may be composed of multiple physically separate components (e.g., a NodeB component and a RNC component, or a BTS component and a BSC component, etc.), which may each have their own respective components. In certain scenarios in which network node 1060 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 1060 may be configured to support multiple radio access technologies (RATs). In such embodiments, some components may be duplicated (e.g., separate device readable medium 1080 for the different RATs) and some components may be reused (e.g., the same antenna 1062 may be shared by the RATs). Network node 1060 may also include multiple sets of the various illustrated components for different wireless technologies integrated into network node 1060, such as, for example, GSM, WCDMA, LTE, NR, WiFi, or Bluetooth wireless technologies. These wireless technologies may be integrated into the same or different chip or set of chips and other components within network node 1060.

Processing circuitry 1070 is configured to perform any determining, calculating, or similar operations (e.g., certain obtaining operations) described herein as being provided by a network node. These operations performed by processing circuitry 1070 may include processing information obtained by processing circuitry 1070 by, for example, converting the obtained information into other information, comparing the obtained information or converted information to information stored in the network node, and/or performing one or more operations based on the obtained information or converted information, and as a result of said processing making a determination.

Processing circuitry 1070 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 1060 components, such as device readable medium 1080, network node 1060 functionality. For example, processing circuitry 1070 may execute instructions stored in device readable medium 1080 or in memory within processing circuitry 1070. Such functionality may include providing any of the various wireless features, functions, or benefits discussed herein. In some embodiments, processing circuitry 1070 may include a system on a chip (SOC).

In some embodiments, processing circuitry 1070 may include one or more of radio frequency (RF) transceiver circuitry 1072 and baseband processing circuitry 1074. In some embodiments, radio frequency (RF) transceiver circuitry 1072 and baseband processing circuitry 1074 may be on separate chips (or sets of chips), boards, or units, such as radio units and digital units. In alternative embodiments, part or all of RF transceiver circuitry 1072 and baseband processing circuitry 1074 may be on the same chip or set of chips, boards, or units In certain embodiments, some or all of the functionality described herein as being provided by a network node, base station, eNB or other such network device may be performed by processing circuitry 1070 executing instructions stored on device readable medium 1080 or memory within processing circuitry 1070. In alternative embodiments, some or all of the functionality may be provided by processing circuitry 1070 without executing instructions stored on a separate or discrete device readable medium, such as in a hard-wired manner. In any of those embodiments, whether executing instructions stored on a device readable storage medium or not, processing circuitry 1070 can be configured to perform the described functionality. The benefits provided by such functionality are not limited to processing circuitry 1070 alone or to other components of network node 1060, but are enjoyed by network node 1060 as a whole, and/or by end users and the wireless network generally.

Device readable medium 1080 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 1070. Device readable medium 1080 may store any suitable instructions, data or information, including a computer program, software, an application including one or more of logic, rules, code, tables, etc, and/or other instructions capable of being executed by processing circuitry 1070 and, utilized by network node 1060. Device readable medium 1080 may be used to store any calculations made by processing circuitry 1070 and/or any data received via interface 1090. In some embodiments, processing circuitry 1070 and device readable medium 1080 may be considered to be integrated.

Interface 1090 is used in the wired or wireless communication of signalling and/or data between network node 1060, network 1006, and/or WDs 1010. As illustrated, interface 1090 comprises port(s)/terminal(s) 1094 to send and receive data, for example to and from network 1006 over a wired connection. Interface 1090 also includes radio front end circuitry 1092 that may be coupled to, or in certain embodiments a part of, antenna 1062. Radio front end circuitry 1092 comprises filters 1098 and amplifiers 1096. Radio front end circuitry 1092 may be connected to antenna 1062 and processing circuitry 1070. Radio front end circuitry may be configured to condition signals communicated between antenna 1062 and processing circuitry 1070. Radio front end circuitry 1092 may receive digital data that is to be sent out to other network nodes or WDs via a wireless connection. Radio front end circuitry 1092 may convert the digital data into a radio signal having the appropriate channel and bandwidth parameters using a combination of filters 1098 and/or amplifiers 1096. The radio signal may then be transmitted via antenna 1062. Similarly, when receiving data, antenna 1062 may collect radio signals which are then converted into digital data by radio front end circuitry 1092. The digital data may be passed to processing circuitry 1070. In other embodiments, the interface may comprise different components and/or different combinations of components.

In certain alternative embodiments, network node 1060 may not include separate radio front end circuitry 1092, instead, processing circuitry 1070 may comprise radio front end circuitry and may be connected to antenna 1062 without separate radio front end circuitry 1092. Similarly, in some embodiments, all or some of RF transceiver circuitry 1072 may be considered a part of interface 1090. In still other embodiments, interface 1090 may include one or more ports or terminals 1094, radio front end circuitry 1092, and RF transceiver circuitry 1072, as part of a radio unit (not shown), and interface 1090 may communicate with baseband processing circuitry 1074, which is part of a digital unit (not shown).

Antenna 1062 may include one or more antennas, or antenna arrays, configured to send and/or receive wireless signals. Antenna 1062 may be coupled to radio front end circuitry 1090 and may be any type of antenna capable of transmitting and receiving data and/or signals wirelessly. In some embodiments, antenna 1062 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 1062 may be separate from network node 1060 and may be connectable to network node 1060 through an interface or port.

Antenna 1062, interface 1090, and/or processing circuitry 1070 may be configured to perform any receiving operations and/or certain obtaining operations described herein as being executed by a network node. Any information, data and/or signals may be received from a wireless device, another network node and/or any other network equipment. Similarly, antenna 1062, interface 1090, and/or processing circuitry 1070 may be configured to perform any transmitting operations described herein as being executed by a network node. Any information, data and/or signals may be transmitted to a wireless device, another network node and/or any other network equipment.

Power circuitry 1087 may comprise, or be coupled to, power management circuitry and is configured to supply the components of network node 1060 with power for performing the functionality described herein. Power circuitry 1087 may receive power from power source 1086. Power source

1086 and/or power circuitry 1087 may be configured to provide power to the various components of network node 1060 in a form suitable for the respective components (e.g., at a voltage and current level needed for each respective component). Power source 1086 may either be included in, or external to, power circuitry 1087 and/or network node 1060. For example, network node 1060 may be connectable to an external power source (e.g., an electricity outlet) via an input circuitry or interface such as an electrical cable, whereby the external power source supplies power to power circuitry 1087. As a further example, power source 1086 may comprise a source of power in the form of a battery or battery pack which is connected to, or integrated in, power circuitry 1087. The battery may provide backup power should the external power source fail. Other types of power sources, such as photovoltaic devices, may also be used.

Alternative embodiments of network node 1060 may include additional components beyond those shown in FIG. 18 that may be responsible for providing certain aspects of the network node's functionality, including any of the functionality described herein and/or any functionality necessary to support the subject matter described herein. For example, network node 1060 may include user interface equipment to allow input of information into network node 1060 and to allow output of information from network node 1060. This may allow a user to perform diagnostic, maintenance, repair, and other administrative functions for network node 1060.

As used herein, wireless device (WD) refers to a device capable, configured, arranged and/or operable to communicate wirelessly with network nodes and/or other wireless devices. Unless otherwise noted, the term WD may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a voice over IP (VOIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc., A WD may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a machine-to-machine (M2M) device, which may in a 3GPP context be referred to as an MTC device. As one particular example, the WD may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated, wireless device 1010 includes antenna 1011, interface 1014, processing circuitry 1020, device readable medium 1030, user interface equipment 1032, auxiliary equipment 1034, power source 1036 and power circuitry 1037. WD 1010 may include multiple sets of one or more of the illustrated components for different wireless technologies supported by WD 1010, such as, for example, GSM, WCDMA, LTE, NR, WiFi, WiMAX, or Bluetooth wireless technologies, just to mention a few. These wireless technologies may be integrated into the same or different chips or set of chips as other components within WD 1010.

Antenna 1011 may include one or more antennas or antenna arrays, configured to send and/or receive wireless signals, and is connected to interface 1014. In certain alternative embodiments, antenna 1011 may be separate from WD 1010 and be connectable to WD 1010 through an interface or port. Antenna 1011, interface 1014, and/or processing circuitry 1020 may be configured to perform any receiving or transmitting operations described herein as being executed by a WD. Any information, data and/or signals may be received from a network node and/or another WD. In some embodiments, radio front end circuitry and/or antenna 1011 may be considered an interface.

As illustrated, interface 1014 comprises radio front end circuitry 1012 and antenna 1011. Radio front end circuitry 1012 comprises one or more filters 1018 and amplifiers 1016. Radio front end circuitry 1014 is connected to antenna 1011 and processing circuitry 1020, and is configured to condition signals communicated between antenna 1011 and processing circuitry 1020. Radio front end circuitry 1012 may be coupled to or a part of antenna 1011. In some embodiments, WD 1010 may not include separate radio front end circuitry 1012; rather, processing circuitry 1020 may comprise radio front end circuitry and may be connected to antenna 1011. Similarly, in some embodiments, some or all of RF transceiver circuitry 1022 may be considered a part of interface 1014. Radio front end circuitry 1012 may receive digital data that is to be sent out to other network nodes or WDs via a wireless connection. Radio front end circuitry 1012 may convert the digital data into a radio signal having the appropriate channel and bandwidth parameters using a combination of filters 1018 and/or amplifiers 1016. The radio signal may then be transmitted via antenna 1011. Similarly, when receiving data, antenna 1011 may collect radio signals which are then converted into digital data by radio front end circuitry 1012. The digital data may be passed to processing circuitry 1020. In other embodiments, the interface may comprise different components and/or different combinations of components.

Processing circuitry 1020 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other WD 1010 components, such as device readable medium 1030, WD 1010 functionality. Such functionality may include providing any of the various wireless features or benefits discussed herein. For example, processing circuitry 1020 may execute instructions stored in device readable medium 1030 or in memory within processing circuitry 1020 to provide the functionality disclosed herein.

As illustrated, processing circuitry 1020 includes one or more of RF transceiver circuitry 1022, baseband processing circuitry 1024, and application processing circuitry 1026. In other embodiments, the processing circuitry may comprise different components and/or different combinations of components. In certain embodiments processing circuitry 1020 of WD 1010 may comprise a SOC. In some embodiments, RF transceiver circuitry 1022, baseband processing circuitry 1024, and application processing circuitry 1026 may be on separate chips or sets of chips. In alternative embodiments, part or all of baseband processing circuitry 1024 and application processing circuitry 1026 may be combined into one chip or set of chips, and RF transceiver circuitry 1022 may be on a separate chip or set of chips. In still alternative embodiments, part or all of RF transceiver circuitry 1022 and baseband processing circuitry 1024 may be on the same chip or set of chips, and application processing circuitry 1026 may be on a separate chip or set of chips. In yet other alternative embodiments, part or all of RF transceiver circuitry 1022, baseband processing circuitry 1024, and application processing circuitry 1026 may be combined in the same chip or set of chips. In some embodiments, RF transceiver circuitry 1022 may be a part of interface 1014. RF transceiver circuitry 1022 may condition RF signals for processing circuitry 1020.

In certain embodiments, some or all of the functionality described herein as being executed by a WD may be provided by processing circuitry 1020 executing instructions stored on device readable medium 1030, which in certain embodiments may be a computer-readable storage medium. In alternative embodiments, some or all of the functionality may be provided by processing circuitry 1020 without executing instructions stored on a separate or discrete device readable storage medium, such as in a hard-wired manner. In any of those particular embodiments, whether executing instructions stored on a device readable storage medium or not, processing circuitry 1020 can be configured to perform the described functionality. The benefits provided by such functionality are not limited to processing circuitry 1020 alone or to other components of WD 1010, but are enjoyed by WD 1010 as a whole, and/or by end users and the wireless network generally.

Processing circuitry 1020 may be configured to perform any determining, calculating, or similar operations (e.g., certain obtaining operations) described herein as being executed by a WD. These operations, as performed by processing circuitry 1020, may include processing information obtained by processing circuitry 1020 by, for example, converting the obtained information into other information, comparing the obtained information or converted information to information stored by WD 1010, and/or performing one or more operations based on the obtained information or converted information, and as a result of said processing making a determination.

Device readable medium 1030 may be operable to store a computer program, software, an application including one or more of logic, rules, code, tables, etc, and/or other instructions capable of being executed by processing circuitry 1020. Device readable medium 1030 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 1020. In some embodiments, processing circuitry 1020 and device readable medium 1030 may be considered to be integrated.

User interface equipment 1032 may provide components that allow for a human user to interact with WD 1010. Such interaction may be of many forms, such as visual, audial, tactile, etc. User interface equipment 1032 may be operable to produce output to the user and to allow the user to provide input to WD 1010. The type of interaction may vary depending on the type of user interface equipment 1032 installed in WD 1010. For example, if WD 1010 is a smart phone, the interaction may be via a touch screen; if WD 1010 is a smart meter, the interaction may be through a screen that provides usage (e.g., the number of gallons used) or a speaker that provides an audible alert (e.g., if smoke is detected). User interface equipment 1032 may include input interfaces, devices and circuits, and output interfaces, devices and circuits. User interface equipment 1032 is configured to allow input of information into WD 1010, and is connected to processing circuitry 1020 to allow processing circuitry 1020 to process the input information. User interface equipment 1032 may include, for example, a microphone, a proximity or other sensor, keys/buttons, a touch display, one or more cameras, a USB port, or other input circuitry. User interface equipment 1032 is also configured to allow output of information from WD 1010, and to allow processing circuitry 1020 to output information from WD 1010. User interface equipment 1032 may include, for example, a speaker, a display, vibrating circuitry, a USB port, a headphone interface, or other output circuitry. Using one or more input and output interfaces, devices, and circuits, of user interface equipment 1032, WD 1010 may communicate with end users and/or the wireless network, and allow them to benefit from the functionality described herein.

Auxiliary equipment 1034 is operable to provide more specific functionality which may not be generally performed by WDs. This may comprise specialized sensors for doing measurements for various purposes, interfaces for additional types of communication such as wired communications etc. The inclusion and type of components of auxiliary equipment 1034 may vary depending on the embodiment and/or scenario.

Power source 1036 may, in some embodiments, be in the form of a battery or battery pack. Other types of power sources, such as an external power source (e.g., an electricity outlet), photovoltaic devices or power cells, may also be used. WD 1010 may further comprise power circuitry 1037 for delivering power from power source 1036 to the various parts of WD 1010 which need power from power source 1036 to carry out any functionality described or indicated herein. Power circuitry 1037 may in certain embodiments comprise power management circuitry. Power circuitry 1037 may additionally or alternatively be operable to receive power from an external power source; in which case WD 1010 may be connectable to the external power source (such as an electricity outlet) via input circuitry or an interface such as an electrical power cable. Power circuitry 1037 may also in certain embodiments be operable to deliver power from an external power source to power source 1036. This may be, for example, for the charging of power source 1036. Power circuitry 1037 may perform any formatting, converting, or other modification to the power from power source 1036 to make the power suitable for the respective components of WD 1010 to which power is supplied.

Figure 19:
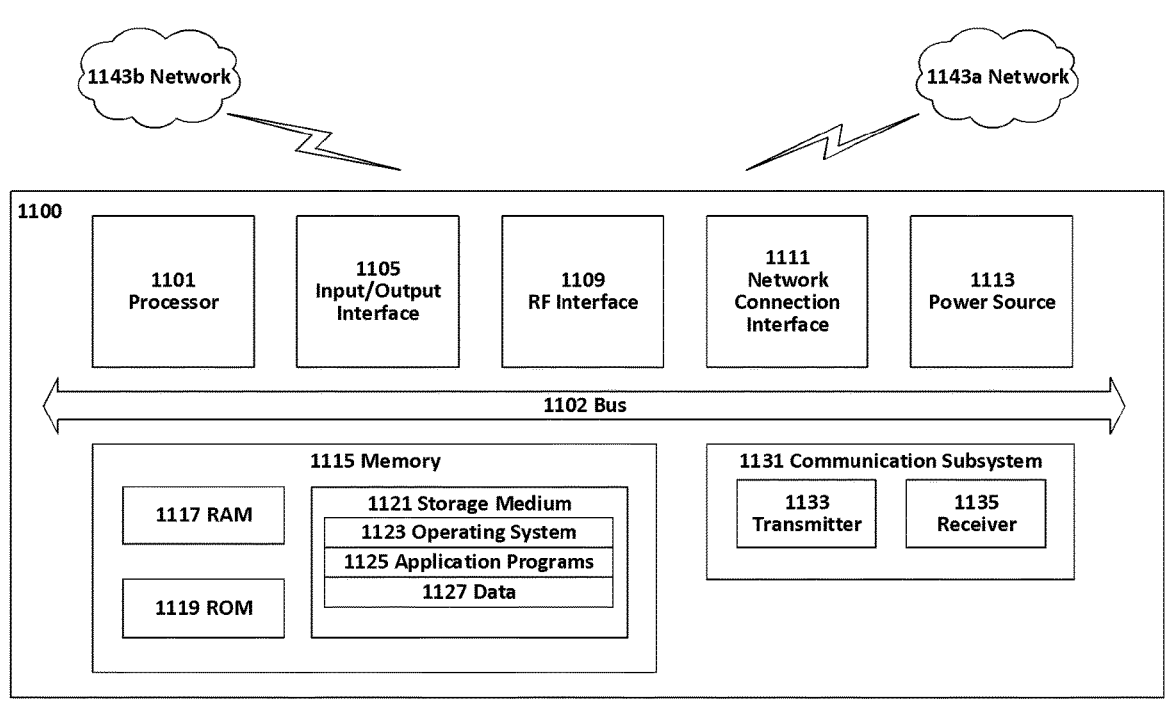
FIG. 19 is a schematic showing a user equipment in accordance with some embodiments.

FIG. 19 is a schematic showing a user equipment in accordance with some embodiments.

FIG. 19 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 1100 may be any UE identified by the 3rd Generation Partnership Project (3GPP), including a NB-IOT UE, a machine type communication (MTC) UE, and/or an enhanced MTC (eMTC) UE. UE 1100, as illustrated in FIG. 19, is one example of a WD configured for communication in accordance with one or more communication standards promulgated by the 3rd Generation Partnership Project (3GPP), such as 3GPP's GSM, UMTS, LTE, and/or 5G standards. As mentioned previously, the term WD and UE may be used interchangeably. Accordingly, although FIG. 19 is a UE, the components discussed herein are equally applicable to a WD, and vice-versa.

In FIG. 19, UE 1100 includes processing circuitry 1101 that is operatively coupled to input/output interface 1105, radio frequency (RF) interface 1109, network connection interface 1111, memory 1115 including random access memory (RAM) 1117, read-only memory (ROM) 1119, and storage medium 1121 or the like, communication subsystem 1131, power source 1133, and/or any other component, or any combination thereof. Storage medium 1121 includes operating system 1123, application program 1125, and data 1127. In other embodiments, storage medium 1121 may include other similar types of information. Certain UEs may utilize all of the components shown in FIG. 19, or only a subset of the components. The level of integration between the components may vary from one UE to another UE. Further, certain UEs may contain multiple instances of a component, such as multiple processors, memories, transceivers, transmitters, receivers, etc.

In FIG. 19, processing circuitry 1101 may be configured to process computer instructions and data. Processing circuitry 1101 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 1101 may include two central processing units (CPUs). Data may be information in a form suitable for use by a computer.

In the depicted embodiment, input/output interface 1105 may be configured to provide a communication interface to an input device, output device, or input and output device. UE 1100 may be configured to use an output device via input/output interface 1105. An output device may use the same type of interface port as an input device. For example, a USB port may be used to provide input to and output from UE 1100. The output device may be a speaker, a sound card, a video card, a display, a monitor, a printer, an actuator, an emitter, a smartcard, another output device, or any combination thereof. UE 1100 may be configured to use an input device via input/output interface 1105 to allow a user to capture information into UE 1100. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 19, RF interface 1109 may be configured to provide a communication interface to RF components such as a transmitter, a receiver, and an antenna. Network connection interface 1111 may be configured to provide a communication interface to network 1143*a*. Network 1143*a* may encompass wired and/or wireless networks such as a local-area network (LAN), a wide-area network (WAN), a computer network, a wireless network, a telecommunications network, another like network or any combination thereof. For example, network 1143*a* may comprise a Wi-Fi network. Network connection interface 1111 may be configured to include a receiver and a transmitter interface used to communicate with one or more other devices over a communication network according to one or more communication protocols, such as Ethernet, TCP/IP, SONET, ATM, or the like. Network connection interface 1111 may implement receiver and transmitter functionality appropriate to the communication network links (e.g., optical, electrical, and the like). The transmitter and receiver functions may share circuit components, software or firmware, or alternatively may be implemented separately.

RAM 1117 may be configured to interface via bus 1102 to processing circuitry 1101 to provide storage or caching of data or computer instructions during the execution of software programs such as the operating system, application programs, and device drivers. ROM 1119 may be configured to provide computer instructions or data to processing circuitry 1101. For example, ROM 1119 may be configured to store invariant low-level system code or data for basic system functions such as basic input and output (I/O), startup, or reception of keystrokes from a keyboard that are stored in a non-volatile memory. Storage medium 1121 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 1121 may be configured to include operating system 1123, application program 1125 such as a web browser application, a widget or gadget engine or another application, and data file 1127. Storage medium 1121 may store, for use by UE 1100, any of a variety of various operating systems or combinations of operating systems.

Storage medium 1121 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 1121 may allow UE 1100 to access computer-executable instructions, application programs or the like, stored on transitory or non-transitory memory media, to off-load data, or to upload data. An article of manufacture, such as one utilizing a communication system may be tangibly embodied in storage medium 1121, which may comprise a device readable medium.

In FIG. 19, processing circuitry 1101 may be configured to communicate with network 1143b using communication subsystem 1131. Network 1143a and network 1143b may be the same network or networks or different network or networks. Communication subsystem 1131 may be configured to include one or more transceivers used to communicate with network 1143b. For example, communication subsystem 1131 may be configured to include one or more transceivers used to communicate with one or more remote transceivers of another device capable of wireless communication such as another WD, UE, or base station of a radio access network (RAN) according to one or more communication protocols, such as IEEE 802.11, CDMA, WCDMA, GSM, LTE, UTRAN, WiMax, or the like. Each transceiver may include transmitter 1133 and/or receiver 1135 to implement transmitter or receiver functionality, respectively, appropriate to the RAN links (e.g., frequency allocations and the like). Further, transmitter 1133 and receiver 1135 of each transceiver may share circuit components, software or firmware, or alternatively may be implemented separately.

In the illustrated embodiment, the communication functions of communication subsystem 1131 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 1131 may include cellular communication, Wi-Fi communication, Bluetooth communication, and GPS communication. Network 1143b may encompass wired and/or wireless networks such as a local-area network (LAN), a wide-area network (WAN), a computer network, a wireless network, a telecommunications network, another like network or any combination thereof. For example, network 1143b may be a cellular network, a Wi-Fi network, and/or a near-field network. Power source 1113 may be configured to provide alternating current (AC) or direct current (DC) power to components of UE 1100.

The features, benefits and/or functions described herein may be implemented in one of the components of UE 1100 or partitioned across multiple components of UE 1100. Further, the features, benefits, and/or functions described herein may be implemented in any combination of hardware, software or firmware. In one example, communication subsystem 1131 may be configured to include any of the components described herein. Further, processing circuitry 1101 may be configured to communicate with any of such components over bus 1102. In another example, any of such components may be represented by program instructions stored in memory that when executed by processing circuitry 1101 perform the corresponding functions described herein. In another example, the functionality of any of such components may be partitioned between processing circuitry 1101 and communication subsystem 1131. In another example, the non-computationally intensive functions of any of such components may be implemented in software or firmware and the computationally intensive functions may be implemented in hardware.

Figure 20:
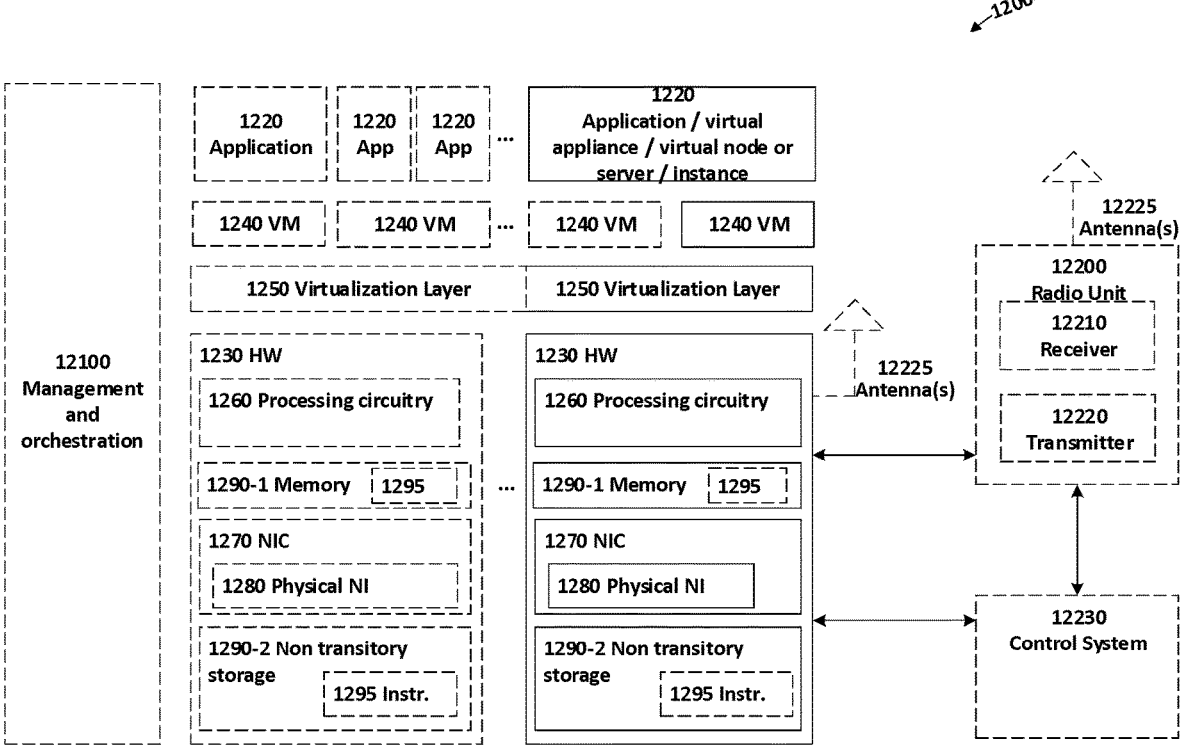
FIG. 20 is a schematic showing a virtualization environment in accordance with some embodiments.

FIG. 20 is a schematic showing a virtualization environment in accordance with some embodiments.

FIG. 20 is a schematic block diagram illustrating a virtualization environment 1200 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 1200 hosted by one or more of hardware nodes 1230. Further, in embodiments in which the virtual node is not a radio access node or does not require radio connectivity (e.g., a core network node), then the network node may be entirely virtualized.

The functions may be implemented by one or more applications 1220 (which may alternatively be called software instances, virtual appliances, network functions, virtual nodes, virtual network functions, etc.) operative to implement some of the features, functions, and/or benefits of some of the embodiments disclosed herein. Applications 1220 are run in virtualization environment 1200 which provides hardware 1230 comprising processing circuitry 1260 and memory 1290. Memory 1290 contains instructions 1295 executable by processing circuitry 1260 whereby application 1220 is operative to provide one or more of the features, benefits, and/or functions disclosed herein.

Virtualization environment 1200, comprises general-purpose or special-purpose network hardware devices 1230 comprising a set of one or more processors or processing circuitry 1260, which may be commercial off-the-shelf (COTS) processors, dedicated Application Specific Integrated Circuits (ASICs), or any other type of processing circuitry including digital or analog hardware components or special purpose processors. Each hardware device may comprise memory 1290-1 which may be non-persistent memory for temporarily storing instructions 1295 or software executed by processing circuitry 1260. Each hardware device may comprise one or more network interface controllers (NICs) 1270, also known as network interface cards, which include physical network interface 1280. Each hardware device may also include non-transitory, persistent, machine-readable storage media 1290-2 having stored therein software 1295 and/or instructions executable by processing circuitry 1260. Software 1295 may include any type of software including software for instantiating one or more virtualization layers 1250 (also referred to as hypervisors), software to execute virtual machines 1240 as well as software allowing it to execute functions, features and/or benefits described in relation with some embodiments described herein.

Virtual machines 1240, comprise virtual processing, virtual memory, virtual networking or interface and virtual storage, and may be run by a corresponding virtualization layer 1250 or hypervisor. Different embodiments of the instance of virtual appliance 1220 may be implemented on one or more of virtual machines 1240, and the implementations may be made in different ways.

During operation, processing circuitry 1260 executes software 1295 to instantiate the hypervisor or virtualization layer 1250, which may sometimes be referred to as a virtual machine monitor (VMM). Virtualization layer 1250 may present a virtual operating platform that appears like networking hardware to virtual machine 1240.

As shown in FIG. 20, hardware 1230 may be a standalone network node with generic or specific components. Hardware 1230 may comprise antenna 12225 and may implement some functions via virtualization. Alternatively, hardware 1230 may be part of a larger cluster of hardware (e.g. such as in a data center or customer premise equipment (CPE)) where many hardware nodes work together and are managed via management and orchestration (MANO) 12100, which, among others, oversees lifecycle management of applications 1220.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 1240 may be a software implementation of a physical machine that runs programs as if they were executing on a physical, non-virtualized machine. Each of virtual machines 1240, and that part of hardware 1230 that executes that virtual machine, be it hardware dedicated to that virtual machine and/or hardware shared by that virtual machine with others of the virtual machines 1240, forms a separate virtual network elements (VNE).

Still in the context of NFV, Virtual Network Function (VNF) is responsible for handling specific network functions that run in one or more virtual machines 1240 on top of hardware networking infrastructure 1230 and corresponds to application 1220 in FIG. 20.

In some embodiments, one or more radio units 12200 that each include one or more transmitters 12220 and one or more receivers 12210 may be coupled to one or more antennas 12225. Radio units 12200 may communicate directly with hardware nodes 1230 via one or more appropriate network interfaces and may be used in combination with the virtual components to provide a virtual node with radio capabilities, such as a radio access node or a base station.

In some embodiments, some signalling can be effected with the use of control system 12230 which may alternatively be used for communication between the hardware nodes 1230 and radio units 12200.

Figure 21:
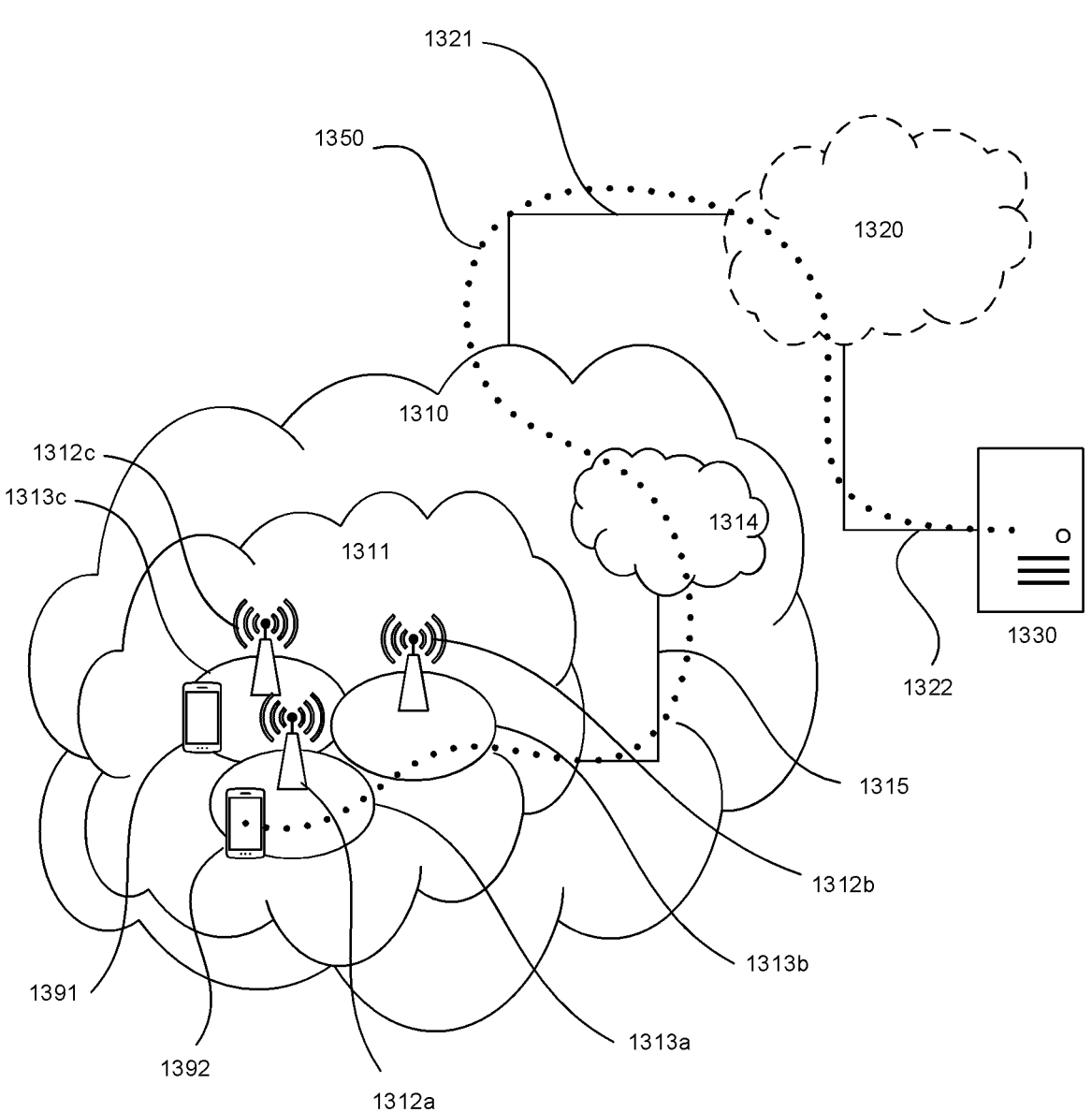
FIG. 21 is a schematic showing a telecommunication network connected via an intermediate network to a host computer in accordance with some embodiments.

FIG. 21 is a schematic showing a telecommunication network connected via an intermediate network to a host computer in accordance with some embodiments.

With reference to FIG. 21, in accordance with an embodiment, a communication system includes telecommunication network 1310, such as a 3GPP-type cellular network, which comprises access network 1311, such as a radio access network, and core network 1314. Access network 1311 comprises a plurality of base stations 1312a, 1312b, 1312c, such as NBs, eNBs, gNBs or other types of wireless access points, each defining a corresponding coverage area 1313a,

1313b, 1313c. Each base station 1312a, 1312b, 1312c is connectable to core network 1314 over a wired or wireless connection 1315. A first UE 1391 located in coverage area 1313c is configured to wirelessly connect to, or be paged by, the corresponding base station 1312c. A second UE 1392 in coverage area 1313a is wirelessly connectable to the corresponding base station 1312a. While a plurality of UEs 1391, 1392 are illustrated in this example, the disclosed embodiments are equally applicable to a situation where a sole UE is in the coverage area or where a sole UE is connecting to the corresponding base station 1312.

Telecommunication network 1310 is itself connected to host computer 1330, which may be embodied in the hardware and/or software of a standalone server, a cloud-implemented server, a distributed server or as processing resources in a server farm. Host computer 1330 may be under the ownership or control of a service provider, or may be operated by the service provider or on behalf of the service provider. Connections 1321 and 1322 between telecommunication network 1310 and host computer 1330 may extend directly from core network 1314 to host computer 1330 or may go via an optional intermediate network 1320. Intermediate network 1320 may be one of, or a combination of more than one of, a public, private or hosted network; intermediate network 1320, if any, may be a backbone network or the Internet; in particular, intermediate network 1320 may comprise two or more sub-networks (not shown).

The communication system of FIG. 21 as a whole enables connectivity between the connected UEs 1391, 1392 and host computer 1330. The connectivity may be described as an over-the-top (OTT) connection 1350. Host computer 1330 and the connected UEs 1391, 1392 are configured to communicate data and/or signalling via OTT connection 1350, using access network 1311, core network 1314, any intermediate network 1320 and possible further infrastructure (not shown) as intermediaries. OTT connection 1350 may be transparent in the sense that the participating communication devices through which OTT connection 1350 passes are unaware of routing of uplink and downlink communications. For example, base station 1312 may not or need not be informed about the past routing of an incoming downlink communication with data originating from host computer 1330 to be forwarded (e.g., handed over) to a connected UE 1391. Similarly, base station 1312 need not be aware of the future routing of an outgoing uplink communication originating from the UE 1391 towards the host computer 1330.

Figure 22:
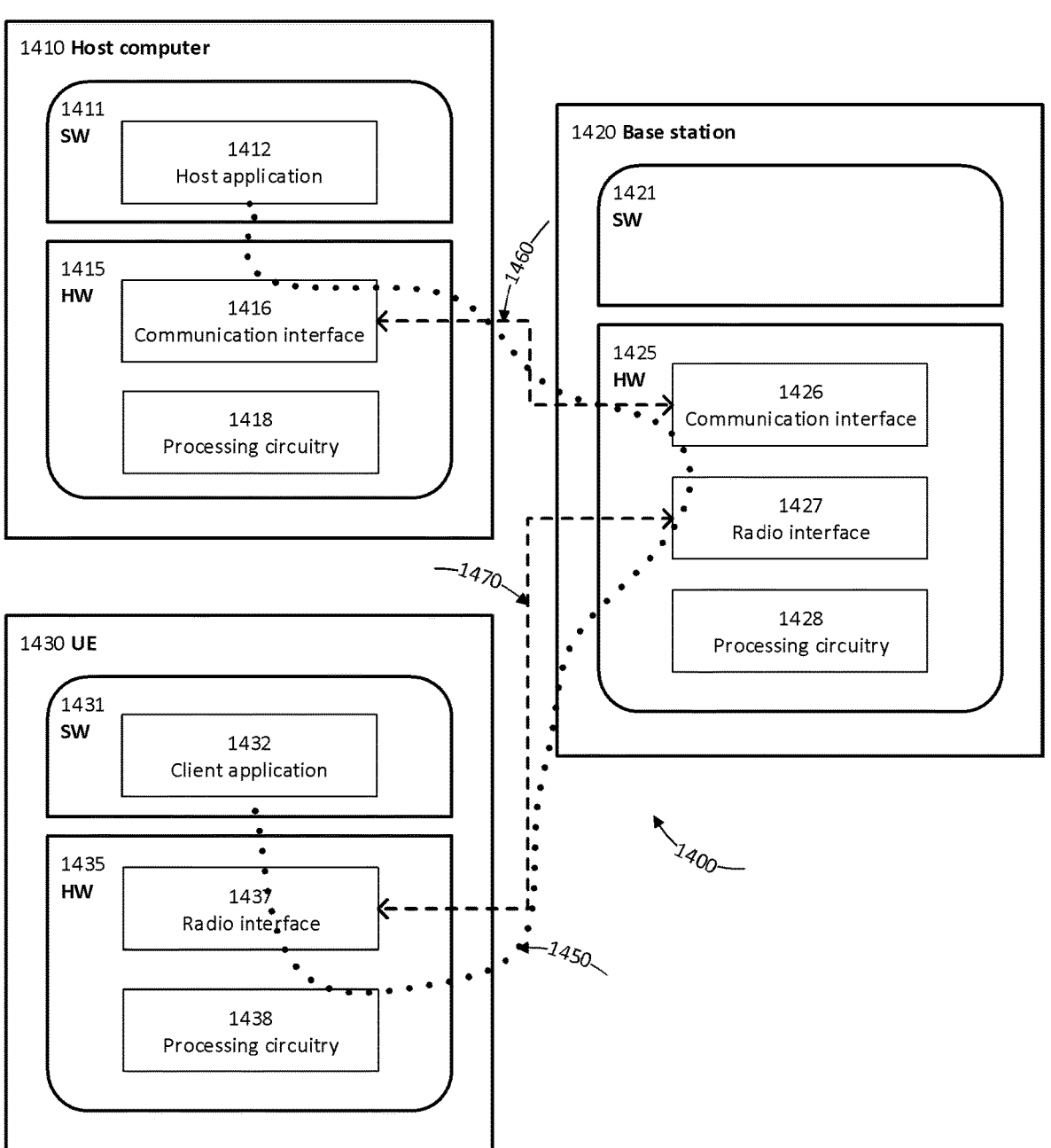
FIG. 22 is a schematic showing a host computer communicating via a base station with a user equipment over a partially wireless connection in accordance with some embodiments.

FIG. 22 is a schematic showing a host computer communicating via a base station with a user equipment over a partially wireless connection in accordance with some embodiments.

Example implementations, in accordance with an embodiment, of the UE, base station and host computer discussed in the preceding paragraphs will now be described with reference to FIG. 22. In communication system 1400, host computer 1410 comprises hardware 1415 including communication interface 1416 configured to set up and maintain a wired or wireless connection with an interface of a different communication device of communication system 1400. Host computer 1410 further comprises processing circuitry 1418, which may have storage and/or processing capabilities. In particular, processing circuitry 1418 may comprise one or more programmable processors, application-specific integrated circuits, field programmable gate arrays or combinations of these (not shown) adapted to execute instructions. Host computer 1410 further comprises software 1411, which is stored in or accessible by host computer 1410 and executable by processing circuitry 1418. Software 1411 includes host application 1412. Host application 1412 may be operable to provide a service to a remote user, such as UE 1430 connecting via OTT connection 1450 terminating at UE 1430 and host computer 1410. In providing the service to the remote user, host application 1412 may provide user data which is transmitted using OTT connection 1450.

Communication system 1400 further includes base station 1420 provided in a telecommunication system and comprising hardware 1425 enabling it to communicate with host computer 1410 and with UE 1430. Hardware 1425 may include communication interface 1426 for setting up and maintaining a wired or wireless connection with an interface of a different communication device of communication system 1400, as well as radio interface 1427 for setting up and maintaining at least wireless connection 1470 with UE 1430 located in a coverage area (not shown in FIG. 22) served by base station 1420. Communication interface 1426 may be configured to facilitate connection 1460 to host computer 1410. Connection 1460 may be direct or it may pass through a core network (not shown in FIG. 22) of the telecommunication system and/or through one or more intermediate networks outside the telecommunication system. In the embodiment shown, hardware 1425 of base station 1420 further includes processing circuitry 1428, which may comprise one or more programmable processors, application-specific integrated circuits, field programmable gate arrays or combinations of these (not shown) adapted to execute instructions. Base station 1420 further has software 1421 stored internally or accessible via an external connection.

Communication system 1400 further includes UE 1430 already referred to. Its hardware 1435 may include radio interface 1437 configured to set up and maintain wireless connection 1470 with a base station serving a coverage area in which UE 1430 is currently located. Hardware 1435 of UE 1430 further includes processing circuitry 1438, which may comprise one or more programmable processors, application-specific integrated circuits, field programmable gate arrays or combinations of these (not shown) adapted to execute instructions. UE 1430 further comprises software 1431, which is stored in or accessible by UE 1430 and executable by processing circuitry 1438. Software 1431 includes client application 1432. Client application 1432 may be operable to provide a service to a human or non-human user via UE 1430, with the support of host computer 1410. In host computer 1410, an executing host application 1412 may communicate with the executing client application 1432 via OTT connection 1450 terminating at UE 1430 and host computer 1410. In providing the service to the user, client application 1432 may receive request data from host application 1412 and provide user data in response to the request data. OTT connection 1450 may transfer both the request data and the user data. Client application 1432 may interact with the user to generate the user data that it provides.

It is noted that host computer 1410, base station 1420 and UE 1430 illustrated in FIG. 22 may be similar or identical to host computer 1330, one of base stations 1312*a*, 1312*b*, 1312*c* and one of UEs 1391, 1392 of FIG. 21, respectively. This is to say, the inner workings of these entities may be as shown in FIG. 22 and independently, the surrounding network topology may be that of FIG. 21.

In FIG. 22, OTT connection 1450 has been drawn abstractly to illustrate the communication between host computer 1410 and UE 1430 via base station 1420, without explicit reference to any intermediary devices and the precise routing of messages via these devices. Network infrastructure may determine the routing, which it may be configured to hide from UE 1430 or from the service provider operating host computer 1410, or both. While OTT connection 1450 is active, the network infrastructure may further take decisions by which it dynamically changes the routing (e.g., on the basis of load balancing consideration or reconfiguration of the network).

Wireless connection 1470 between UE 1430 and base station 1420 is in accordance with the teachings of the embodiments described throughout this disclosure. One or more of the various embodiments improve the performance of OTT services provided to UE 1430 using OTT connection 1450, in which wireless connection 1470 forms the last segment. More precisely, the teachings of these embodiments may improve the latency, and power consumption for a reactivation of the network connection, and thereby provide benefits, such as reduced user waiting time, enhanced rate control.

A measurement procedure may be provided for the purpose of monitoring data rate, latency and other factors on which the one or more embodiments improve. There may further be an optional network functionality for reconfiguring OTT connection 1450 between host computer 1410 and UE 1430, in response to variations in the measurement results. The measurement procedure and/or the network functionality for reconfiguring OTT connection 1450 may be implemented in software 1411 and hardware 1415 of host computer 1410 or in software 1431 and hardware 1435 of UE 1430, or both. In embodiments, sensors (not shown) may be deployed in or in association with communication devices through which OTT connection 1450 passes; the sensors may participate in the measurement procedure by supplying values of the monitored quantities exemplified above, or supplying values of other physical quantities from which software 1411, 1431 may compute or estimate the monitored quantities. The reconfiguring of OTT connection 1450 may include message format, retransmission settings, preferred routing etc.; the reconfiguring need not affect base station 1420, and it may be unknown or imperceptible to base station 1420. Such procedures and functionalities may be known and practiced in the art. In certain embodiments, measurements may involve proprietary UE signalling facilitating host computer 1410's measurements of throughput, propagation times, latency and the like. The measurements may be implemented in that software 1411 and 1431 causes messages to be transmitted, in particular empty or 'dummy' messages, using OTT connection 1450 while it monitors propagation times, errors etc.

Figure 23:
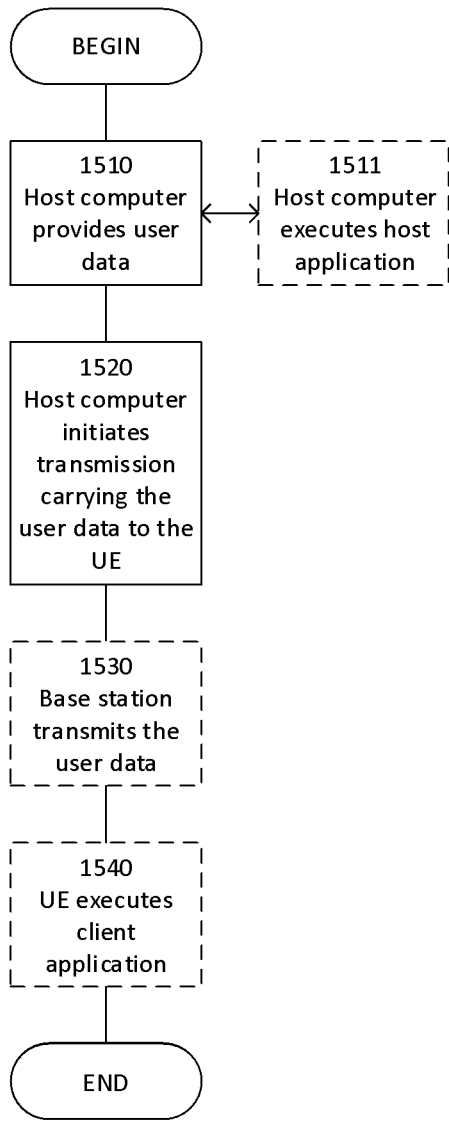
FIG. 23 is a schematic showing methods implemented in a communication system including a host computer, a base station and a user equipment in accordance with some embodiments.

FIG. 23 is a schematic showing methods implemented in a communication system including a host computer, a base station and a user equipment in accordance with some embodiments.

FIG. 23 is a flowchart illustrating a method implemented in a communication system, in accordance with one embodiment. The communication system includes a host computer, a base station and a UE. For simplicity of the present disclosure, only drawing references to FIG. 23 will be included in this section. In step 1510, the host computer provides user data. In substep 1511 (which may be optional) of step 1510, the host computer provides the user data by executing a host application. In step 1520, the host computer initiates a transmission carrying the user data to the UE. In step 1530 (which may be optional), the base station transmits to the UE the user data which was carried in the transmission that the host computer initiated, in accordance with the teachings of the embodiments described throughout this disclosure. In step 1540 (which may also be optional), the UE executes a client application associated with the host application executed by the host computer.

Figure 24:
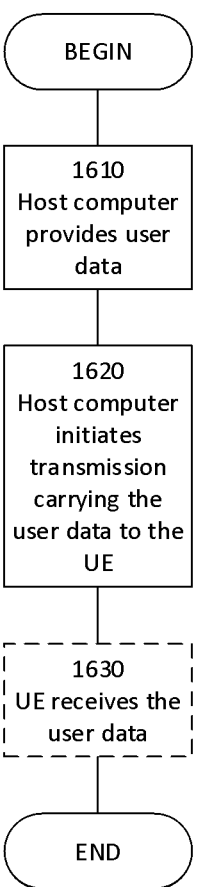
FIG. 24 is a schematic showing methods implemented in a communication system including a host computer, a base station and a user equipment in accordance with some embodiments.

FIG. 24 is a schematic showing methods implemented in a communication system including a host computer, a base station and a user equipment in accordance with some embodiments.

FIG. 24 is a flowchart illustrating a method implemented in a communication system, in accordance with one embodiment. The communication system includes a host computer, a base station and a UE. For simplicity of the present disclosure, only drawing references to FIG. 24 will be included in this section. In step 1610 of the method, the host computer provides user data. In an optional substep (not shown) the host computer provides the user data by executing a host application. In step 1620, the host computer initiates a transmission carrying the user data to the UE. The transmission may pass via the base station, in accordance with the teachings of the embodiments described throughout this disclosure. In step 1630 (which may be optional), the UE receives the user data carried in the transmission.

Figure 25:
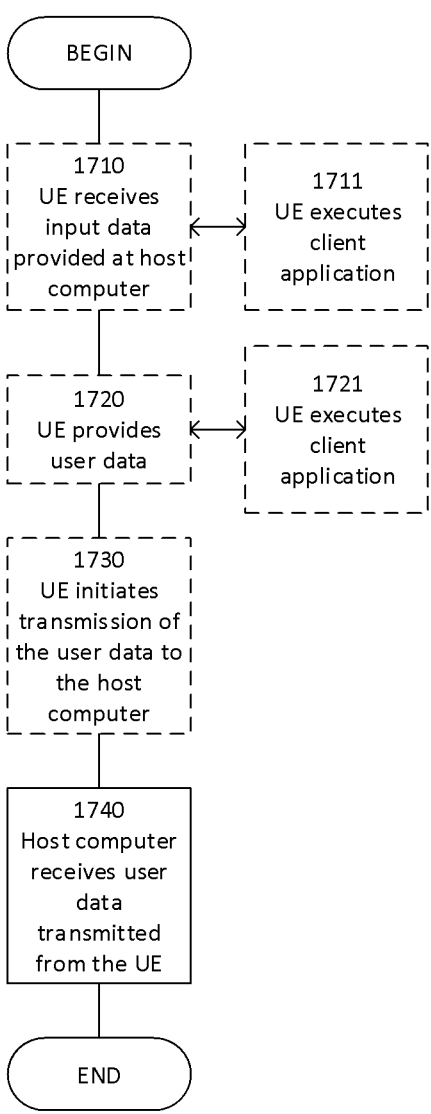
FIG. 25 is a schematic showing methods implemented in a communication system including a host computer, a base station and a user equipment in accordance with some embodiments.

FIG. 25 is a schematic showing methods implemented in a communication system including a host computer, a base station and a user equipment in accordance with some embodiments.

FIG. 25 is a flowchart illustrating a method implemented in a communication system, in accordance with one embodiment. The communication system includes a host computer, a base station and a UE. For simplicity of the present disclosure, only drawing references to FIG. 25 will be included in this section. In step 1710 (which may be optional), the UE receives input data provided by the host computer. Additionally or alternatively, in step 1720, the UE provides user data. In substep 1721 (which may be optional) of step 1720, the UE provides the user data by executing a client application. In substep 1711 (which may be optional) of step 1710, the UE executes a client application which provides the user data in reaction to the received input data provided by the host computer. In providing the user data, the executed client application may further consider user input received from the user. Regardless of the specific manner in which the user data was provided, the UE initiates, in substep 1730 (which may be optional), transmission of the user data to the host computer. In step 1740 of the method, the host computer receives the user data transmitted from the UE, in accordance with the teachings of the embodiments described throughout this disclosure.

Figure 26:
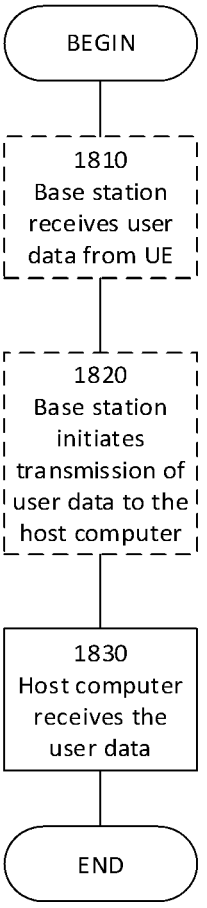
FIG. 26 is a schematic showing methods implemented in a communication system including a host computer, a base station and a user equipment in accordance with some embodiments.

FIG. 26 is a schematic showing methods implemented in a communication system including a host computer, a base station and a user equipment in accordance with some embodiments.

FIG. 26 is a flowchart illustrating a method implemented in a communication system, in accordance with one embodiment. The communication system includes a host computer, a base station and a UE. For simplicity of the present disclosure, only drawing references to FIG. 26 will be included in this section. In step 1810 (which may be optional), in accordance with the teachings of the embodiments described throughout this disclosure, the base station receives user data from the UE. In step 1820 (which may be optional), the base station initiates transmission of the received user data to the host computer. In step 1830 (which may be optional), the host computer receives the user data carried in the transmission initiated by the base station.

According to an aspect of the disclosure it is provided a computer program product being tangibly stored on a computer readable storage medium and including instructions which, when executed on at least one processor, cause the at least one processor to carry out the method related to the handover management entity as described above.

According to an aspect of the disclosure it is provided a computer program product being tangibly stored on a computer readable storage medium and including instructions which, when executed on at least one processor, cause the at least one processor to carry out the method related to the network node as described above.

According to an aspect of the disclosure it is provided a computer-readable storage medium storing instructions which when executed by at least one processor, cause the at least one processor to perform the method related to the handover management entity as described above.

According to an aspect of the disclosure it is provided a computer-readable storage medium storing instructions which when executed by at least one processor, cause the at least one processor to perform the method related to the network node as described above.

In addition, the present disclosure may also provide a carrier containing the computer program as mentioned above, wherein the carrier is one of an electronic signal, optical signal, radio signal, or computer readable storage medium. The computer readable storage medium can be, for example, an optical compact disk or an electronic memory device like a RAM (random access memory), a ROM (read only memory), Flash memory, magnetic tape, CD-ROM, DVD, Blue-ray disc and the like.

The techniques described herein may be implemented by various means so that an apparatus implementing one or more functions of a corresponding apparatus described with an embodiment comprises not only prior art means, but also means for implementing the one or more functions of the corresponding apparatus described with the embodiment and it may comprise separate means for each separate function, or means that may be configured to perform two or more functions. For example, these techniques may be implemented in hardware (one or more apparatuses), firmware (one or more apparatuses), software (one or more modules), or combinations thereof. For a firmware or software, implementation may be made through modules (e.g., procedures, functions, and so on) that perform the functions described herein.

Exemplary embodiments herein have been described above with reference to block diagrams and flowchart illustrations of methods and apparatuses. It will be understood that each block of the block diagrams and flowchart illustrations, and combinations of blocks in the block diagrams and flowchart illustrations, respectively, can be implemented by various means including computer program instructions. These computer program instructions may be loaded onto a general purpose computer, special purpose computer, or other programmable data processing apparatus to produce a machine, such that the instructions which execute on the computer or other programmable data processing apparatus create means for implementing the functions specified in the flowchart block or blocks.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the subject matter described herein, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

While this specification contains many specific implementation details, these should not be construed as limitations on the scope of any implementation or of what may be claimed, but rather as descriptions of features that may be specific to particular embodiments of particular implementations. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

It will be obvious to a person skilled in the art that, as the technology advances, the inventive concept can be implemented in various ways. The above described embodiments are given for describing rather than limiting the disclosure, and it is to be understood that modifications and variations may be resorted to without departing from the spirit and scope of the disclosure as those skilled in the art readily understand. Such modifications and variations are considered to be within the scope of the disclosure and the appended claims. The protection scope of the disclosure is defined by the accompanying claims.

What is claimed is:

1. A method performed by a handover management entity, comprising:
   receiving a handover request from a network node, wherein the handover request indicates that a first terminal device is to be handed over from a source cell to a target cell;
   obtaining a position of the first terminal device;
   predicting a handover result of the first terminal device by a classifier, wherein the position of the first terminal device is used as an input of the classifier and the classifier is trained for the handover from the source cell to the target cell;
   generating a handover decision based on the predicted handover result; and
   sending a handover response comprising the handover decision to the network node.

2. The method according to claim 1, wherein the classifier is trained by a training set and the training set comprises history handover result data regarding the handover from the source cell to the target cell.

3. The method according to claim 2, wherein the training set further comprises handover result data regarding the handover from the source cell to the target cell generated by a generative adversarial network.

4. The method according to claim 3, wherein for a specific type of handover result, a corresponding type of generative adversarial network is trained by using the corresponding type of history handover result data regarding the handover from the source cell to the target cell.

5. The method according to claim 2, wherein the handover result data comprises a position of a terminal device, a handover result, a source cell identifier, a target cell identifier, a wrong cell identifier when the terminal device being handed over to a wrong cell.

6. The method according to claim 5, wherein the handover result data further comprises at least one of:
   antenna information of the source cell,
   antenna information of the target cell,
   antenna information of the wrong cell,
   a relative position of the terminal device to the antenna of a source cell,
   a relative position of the terminal device to the antenna of the target cell, or
   a relative position of the terminal device to the antenna of the wrong cell.

7. The method according to claim 1, wherein the handover result comprises at least one of:
   too late handover;
   too early handover;
   handover to a wrong cell; or
   handover success.

8. The method according to claim 1, wherein
   when the predicted handover result indicates too late handover, the handover decision indicates the network node to decrease a handover triggering difficulty; or
   when the predicted handover result indicates handover success, the handover decision indicates the network node to immediately perform the handover; or
   when the predicted handover result indicates too early handover or handover to a wrong cell, the handover decision is generated further based on the movement information of the first terminal device.

9. The method according to claim 8, further comprising:
   obtaining the movement information of the first terminal device.

10. The method according to claim 9, wherein the movement information of the first terminal device comprises at least one of:
   a moving speed of the first terminal device;
   a moving direction of the first terminal device; or
   an acceleration of the first terminal device.

11. The method according to claim 8, wherein when the handover decision is generated further based on the movement information of the first terminal device,
   when the first terminal device will enter into a handover success area at a particular time point, the handover decision indicates the network node the particular time point for performing the handover; or
   when the first terminal device will enter into a handover success area at a particular time point, the handover decision indicates the network node to perform the handover, wherein the response comprising the handover decision is sent to the network node at or after the particular time point; or
   when the first terminal device is moving far away from a handover success area, the handover decision comprises at least one recommended target cell and indicates the network node to perform cell reselection based on the at least one recommended target cell.

12. The method according to claim 1, further comprising:
   determining at least one handover result area regarding the handover from the source cell to the target cell.

13. The method according to claim 1, further comprising:
   receiving at least a part of history handover result data from the network node.

14. The method according to claim 1, wherein the handover management entity is deployed into an open radio access network.

15. A method performed by a network node, comprising:

sending a handover request to a handover management entity, wherein the handover request indicates that a first terminal device is to be handed over from a source cell to a target cell; and receiving a handover response comprising a handover decision from the handover management entity, wherein the handover decision is generated based on a predicted handover result of the first terminal device and the predicted handover result of the first terminal device is predicted by a classifier, and wherein a position of the first terminal device is used as an input of the classifier and the classifier is trained for the handover from the source cell to the target cell.

16. The method according to claim 15, wherein the classifier is trained by a training set and the training set comprises history handover result data regarding the handover from the source cell to the target cell.

17. The method according to claim 16, wherein the training set further comprises handover result data regarding the handover from the source cell to the target cell generated by a generative adversarial network.

18. The method according to claim 17, wherein for a specific type of handover result, a corresponding type of generative adversarial network is trained by using the corresponding type of history handover result data regarding the handover from the source cell to the target cell.

19. The method according to claim 16, wherein the handover result data comprises a position of a terminal device, a handover result, a source cell identifier, a target cell identifier, a wrong cell identifier when the terminal device being handed over to a wrong cell.

20. The method according to claim 19, wherein the handover result data further comprises at least one of:

antenna information of the source cell, antenna information of the target cell, antenna information of the wrong cell, a relative position of the terminal device to the antenna of a source cell, a relative position of the terminal device to the antenna of the target cell, or a relative position of the terminal device to the antenna of the wrong cell.

\* \* \* \* \*